(12) United States Patent
Donovan et al.

(10) Patent No.: US 9,550,879 B2
(45) Date of Patent: Jan. 24, 2017

(54) HYDRAULIC BARRIER COMPOSITION AND METHOD OF MAKING THE SAME

(71) Applicant: AMCOL INTERNATIONAL CORPORATION, Hoffman Estates, IL (US)

(72) Inventors: Michael Donovan, Huntley, IL (US); Christos Athanassopoulos, Volo, IL (US)

(73) Assignee: AMCOL INTERNATIONAL CORPORATION, Hoffman Estates, IL (US)

( * ) Notice: Subject to any disclaimer, the term of this patent is extended or adjusted under 35 U.S.C. 154(b) by 815 days.

(21) Appl. No.: 13/752,366

(22) Filed: Jan. 28, 2013

(65) Prior Publication Data

US 2013/0196165 A1    Aug. 1, 2013

Related U.S. Application Data

(60) Provisional application No. 61/591,834, filed on Jan. 27, 2012.

(51) Int. Cl.
| | |
|---|---|
| *C08K 3/34* | (2006.01) |
| *B01J 20/12* | (2006.01) |
| *B01J 20/26* | (2006.01) |
| *B01J 20/28* | (2006.01) |
| *B01J 20/30* | (2006.01) |

(52) U.S. Cl.
CPC .............. *C08K 3/346* (2013.01); *B01J 20/12* (2013.01); *B01J 20/26* (2013.01); *B01J 20/2803* (2013.01); *B01J 20/28004* (2013.01); *B01J 20/2805* (2013.01); *B01J 20/28016* (2013.01); *B01J 20/3021* (2013.01); *B01J 20/3078* (2013.01); *B01J 2220/46* (2013.01); *B01J 2220/68* (2013.01)

(58) Field of Classification Search
None
See application file for complete search history.

(56) References Cited

U.S. PATENT DOCUMENTS

| | | | |
|---|---|---|---|
| 4,977,192 A | 12/1990 | Martineu et al. | |
| 6,737,472 B2 | 5/2004 | Zhou et al. | |
| 6,783,802 B2 | 8/2004 | Darlington, Jr. et al. | |
| 2010/0252706 A1* | 10/2010 | Hargis | F03D 11/04 248/237 |
| 2010/0300688 A1* | 12/2010 | Panga | C09K 8/80 166/280.2 |

FOREIGN PATENT DOCUMENTS

| | | |
|---|---|---|
| WO | WO-2004/018005 | 3/2004 |
| WO | WO-2008/133497 | 11/2008 |

OTHER PUBLICATIONS

Athanassopoulos et al., Permeability, puncture, and shear strength testing of composite liner systems under high normal loads, Tailings and Mine Waste (2009).
CETCO, Bentomat Compatibility Testing with Dilute Sodium Cyanide, Technical Reference TR-105 (2000).
International Search Report and Written Opinion, corresponding international application No. PCT/US2013/023508, mailing date Apr. 26, 2013.
Jo et al., Hydraulic conductivity and swelling of nonprehydrated GCLs permeated with single-species salt solutions, J. Geotech. Gioenviron. Engineering, 127(7):557-67 (2001).
Li et al., Preparation and slow-release property of a poly(acrylic acid)/attapulgite/sodium humate superabsorbent composite, J. Appl. Polymer Sci., 103(1):37-45 (2006).
Li et al., Synthesis and properties of clay-based superabsorbent composite, Eur. Polymer J., 41(7):1630-7 (2005).
TRI Environmental Laboratory Report E2308-20-10 (Jun. 27, 2009).
TRI Environmental Laboratory Report E2308-20-10 (Sep. 29, 2008).

* cited by examiner

*Primary Examiner* — Sheeba Ahmed
(74) *Attorney, Agent, or Firm* — Squire Patton Boggs (US) LLP

(57) ABSTRACT

A hydraulic barrier composition can include granules of a water-swellable clay and a water-soluble polymer. Upon contact with a leachate at least portion of the polymer is solvated by the leachate and becomes entrapped in at least one of clay pores, at clay platelet edges, and between adjacent platelets.

60 Claims, 15 Drawing Sheets

HYDRAULIC BARRIER COMPOSITION AND METHOD OF MAKING THE SAME

CROSS-REFERENCE TO RELATED APPLICATION

The benefit under 35 U.S.C. §119(e) of U.S. Provisional Patent Application No. 61/591,834, filed Jan. 27, 2012, is hereby claimed and the disclosure is hereby incorporated in by reference in its entirety.

BACKGROUND

Field of the Disclosure

The disclosure is directed to a hydraulic barrier and method of making the same. More particularly, the disclosure is directed to a hydraulic barrier containing polymer-clay granules and method of making the same, the hydraulic barrier being particularly suited for use in aggressive environments.

Brief Description of Related Technology

Hydraulic barriers are used in a number of industries for water absorption, containment, and/or retention. In a variety of industries, for example, the mining industry, the water source to be absorbed, contained, or retained is present in conditions that are incompatible with use of conventional clay-based barriers or even conventional clay and polymer dry mixtures containing barriers. Conventional barriers include, for example, geosynthetic clay liners, which have a layer of clay, such as bentonite clay, supported by a geotextile or a geomembrane material, mechanically held together by needling, stitching, or chemical adhesives.

Conventional barriers have shown to be ineffective or inefficient if the source has a high or low pH or contains a high concentration of soluble salts, and in particular divalent ions. It is commonly known that bentonite clay swells well in fresh water, but poorly in water having drastic pH conditions (pH<3 or pH>10) and/or containing salts and/or metals, such as saltwater, seawater, acid mining drainage, and the like. In such environments, it may be necessary to sufficiently prehydrate a conventional bentonite clay-based hydraulic barrier with fresh water prior to use, which can be burdensome and cost prohibitive in a variety of applications.

The hydraulic conductivity response of a granular bentonite-based GCL when exposed to a high pH leachate (pH>10) obtained from an aluminum leaching process has been investigated. The bauxite leachate had an ionic strength of 774 millimolar and a ratio of monovalent to multivalent cations (RMD)=1.15 $M^{1/2}$, with Al and Na the predominant metals in solution. The hydraulic conductivity (K) of the GCLs was approximately $10^{-9}$ cm/s when permeated with tap water. When permeated with the highly caustic bauxite leachate, the granular bentonite based GCL became much more permeable, with a final hydraulic conductivity ranging between $4.2 \times 10^{-7}$ cm/s and $1.8 \times 10^{-6}$ cm/s.

Clay-polymer based hydraulic barriers such as those disclosed in U.S. Pat. No. 6,737,472 and U.S. Pat. No. 6,783,802 have been primarily developed with use of a water-absorbent polymer to facilitate and improve the retention of the clay within the hydraulic barrier mat material. For example, U.S. Pat. No. 6,783,802 describes a porous substrate, such as a geotextile liner having a polymerization initiator or polymerization catalyst embedded therein. The hydraulic barrier is formed by contacting this substrate with a monomer, cross-linking agent, and any other desired additives and subjecting it to conditions sufficient to polymerize the monomer within the substrate. The process results in improved retention of and embedding of the clay and polymer within the substrate material. In such a hydraulic barrier it can be preferable to have highly cross-linked polymers to ensure that the polymer remains retained and interlocked with the substrate during use. It was also believed that having such highly cross-linked polymers was necessary to ensure that the polymers were water insoluble and, therefore, would remain within the substrate during use.

SUMMARY

The inventors have advantageously found that a long-term use hydraulic barrier having improved and substantially immediate impermeability in aggressive environments can be formed by providing a clay-polymer hydraulic barrier composition in which the polymer has a wide distribution of molecular weight polymer chains. This beneficially provides a hydraulic barrier that can be used in aggressive environments without the need for prehydration with fresh water. It has further been discovered that the performance characteristics of the hydraulic barrier can be tailored by adjusting various processing conditions in the method of forming the clay-polymer granules. These and additional advantages of the hydraulic barrier of the disclosure are described in detail below.

In accordance with an embodiment of the disclosure, a hydraulic barrier composition includes clay-polymer granules comprising a water-swellable clay and a polymer. The polymer can include a cross-linked polymer portion and a linear polymer portion, wherein upon contact with an aqueous leachate at least a portion of the polymer is solvated by the leachate and at least a portion of the polymer becomes entrapped in at least one of pores of the clay, at clay platelet edges, and between adjacent clay platelets.

In accordance with another embodiment of the disclosure, a hydraulic barrier composition can include clay-polymer granules comprising a water-swellable clay and a polymer. The polymer can include a cross-linked polymer portion and a linear polymer portion. The composition can have a hydraulic conductivity of $1 \times 10$-7 cm/sec or less when exposed to leachates having one or more of an ionic strength of 0.02 mol/liter to 3 mol/liter and a ratio of monovalent to divalent ions (RMD) value of less than 50 $M^{1/2}$.

In accordance with another embodiment of the disclosure, a hydraulic barrier composition can include clay-polymer granules comprising a water-swellable clay and a sulfonated water-soluble polymer. The composition can have a hydraulic conductivity of $1 \times 10$-7 cm/sec or less when exposed to leachates having a pH of less than 1.5 and an ionic strength of about 0.1 mol/liter to about 10 mol/liter.

In accordance with an embodiment of the disclosure, a hydraulic barrier composition includes granules of a water-swellable clay containing a water-soluble or water-swellable polymer capable of being activated by water, to enhance a water barrier property of the water-swellable clay, said granules forming a hydraulic barrier, wherein upon contact to dissolve or disperse at least a portion of the polymer in the water the portion of the polymer becomes entrapped in at least one of clay pores, at clay platelet edges, and between adjacent platelets.

In accordance with an embodiment of the disclosure, a hydraulic barrier includes granules comprising a water-swellable clay and a polymer system, the polymer system having an average molecular weight of about 300,000 and a wide distribution of high and low molecular weight polymer chains such that at least a portion of the polymer dissolves or disperses rapidly in water upon contact of the granules with water and at least a portion of the high molecular weight polymer chains, once dissolved or dispersed in water, become entrapped in at least one of clay pores, at clay platelet edges, and between adjacent platelets of the water-swellable clay.

In accordance with an embodiment of the disclosure, a hydraulic barrier includes granules comprising a water-swellable clay and a polymer system, the polymer system having polymers with a linear and/or lightly-branched structure and capable of being activated by water such that the polymer dissolves or disperses upon contact of the granules with water and at least a portion of the polymer becomes entrapped in at least one of clay pores, at clay platelet edges, and between adjacent platelets of the water-swellable clay.

In accordance with an embodiment of the disclosure, a hydraulic barrier includes first granules comprising a water-swellable clay and a polymer, and second granules mixed with the first granules, the second granules comprising a water-swellable clay. The first granules are capable of being activated by water to form a hydraulic barrier, wherein upon contact of the first granules with water, the polymer dissolves or disperses in water and at least a portion of the polymer becomes entrapped in pores and/or at clay platelet edges and/or between adjacent platelets of the water-swellable clay.

In accordance with further embodiments of the disclosure, a hydraulic barrier can include any of the hydraulic barrier compositions in accordance with the disclosure disposed in a sheet material.

In accordance with further embodiments of the disclosure, a hydraulic barrier can include any of the hydraulic barrier compositions in accordance with the disclosure disposed in a first sheet material and include a second sheet material attached to the first sheet material, with the hydraulic barrier composition being disposed between the first and second sheet materials.

In accordance with an embodiment of the disclosure, a method of containing a leachate includes disposing the hydraulic barrier of any one of the preceding claims in contact with an aqueous leachate, wherein upon contact with the leachate the hydraulic barrier composition is activated to contain the leachate, and upon activation at least a portion the polymer of the clay-polymer granules is solvated by the leachate and at least a portion of the polymer becomes entrapped in at least one of the clay pores, at clay platelet edges, and between adjacent clay platelets.

In accordance with an embodiment of the disclosure, a method of manufacturing a hydraulic barrier includes contacting a clay-containing slurry with a polymerization initiator, wherein the clay-containing slurry comprises water-swellable clay and a monomer; initiating polymerization of the clay-containing slurry and polymerization initiator under conditions sufficient to polymerize the monomer to form a clay-polymer mixture; and grinding the clay-polymer mixture into granules to form clay-polymer granules. The clay-polymer granules have a linear polymer component and a cross-linked polymer component.

In accordance with an embodiment of the disclosure, a method of manufacturing a hydraulic barrier includes forming a slurry of clay, water, and a polymerizable monomer and polymerizing the monomer in the slurry to form a clay/polymer mixture, and shearing the clay-polymer mixture into granules to form clay-polymer granules. Upon contact of the clay-polymer granules with water, the polymer dissolves or disperses in the water and at least a portion of the polymer becomes entrapped in at least one of clay pores, at clay platelet edges, and between adjacent platelets of the water-swellable clay.

In accordance with an embodiment of the disclosure, a method of manufacturing a clay containing entrapped, water-soluble polymer molecules includes forming a slurry of clay, water, and a polymerizable monomer and polymerizing the monomer in the slurry to form a clay/polymer mixture, and grinding the clay-polymer mixture into granules to form clay-polymer granules, such that the average molecular weight of the polymer is reduced, and the water-solubility of the polymer is increased. The polymer, after grinding, has a wide distribution of high and low molecular weight polymer chains such that the polymer dissolves or disperses rapidly in water upon contact of the granules with water and at least a portion of the high molecular weight polymer chains, once dissolved or dispersed in water, become entrapped in at least one of clay pores, at clay platelet edges, and between adjacent platelets of the water-swellable clay.

In accordance with an embodiment of the disclosure, a method of manufacturing a hydraulic barrier includes contacting a clay-containing slurry with a polymerization initiator, wherein the clay-containing slurry comprises clay and a monomer, heating the clay-containing slurry and polymerization initiator under conditions sufficient to polymerize the monomer to form a clay-polymer mixture, and grinding the clay-polymer mixture into granules to form clay-polymer granules. The polymerization conditions result in the polymers having linear, lightly-branched and cross-linked structure. The polymers are capable of being activated by water such that the polymer dissolves or disperses upon contact of the granules with water and at least a portion of the polymer becomes entrapped in at least one of clay pores, at clay platelet edges, and between adjacent platelets of the water-swellable clay.

In accordance with an embodiment of the disclosure, a method of using a hydraulic barrier includes activating a hydraulic barrier comprising a water-swellable clay and a polymer by contacting the hydraulic barrier with water to dissolve or disperse the polymer in water such that at least a portion of the polymer becomes entrapped in at least one of clay pores, at clay platelet edges, and between adjacent platelets of the water-swellable clay to form a substantially water-impermeable barrier.

In accordance with an embodiment of the disclosure, a method of separating higher molecular weight, water-soluble polymer molecules from lower molecular weight water-soluble polymer molecules includes forming a slurry of clay, water, a polymerizable monomer, an initiator, and optionally a crosslinker, and polymerizing the monomer in the slurry to form a clay/polymer mixture, shearing the clay-polymer mixture into granules to form clay-polymer granules, passing water through the clay-polymer granules resulting in lower molecular weight polymer molecules passing through the clay-polymer granules and higher molecular weight polymer molecules being entrapped in the clay.

DETAILED DESCRIPTION

Ranges may be expressed herein as from "about" or "approximately" one particular value and/or to "about" or "approximately" another particular value. When such a range is expressed, another embodiment includes from one particular value and/or to the other particular value. Similarly when values are expressed as approximations by use of the antecedent "about," it will be understood that the particular value forms another embodiment.

Disclosed herein is a hydraulic barrier suitable for use in a variety of environments, including in aggressive environments, in which clay-based barriers are typically less effective due to the inability of the clay to swell rapidly in such conditions. As used herein "aggressive environment" refers to a system in which water absorption, retention or containment is desired, having a high or low pH, a high ionic strength, and a high concentration of divalent and/or multivalent ions. For example, aggressive environments can include water systems having high pH, for example, a pH of 10 or greater, or have low pH, for example, a pH of 3 or less. Aggressive environments can alternatively or additionally have a high ionic strength, for example, an ionic strength greater than 10 mol $dm^{-3}$. The ionic strength (I), expressed as mol $dm^{-3}$, is a function of the concentration of all ions present in that solution and is calculated by Formula 1, below:

$$I = \frac{1}{2}\sum C_i Z_i^2. \quad \text{Formula 1}$$

wherein $C_i$ is a molar concentration of $i^{th}$ ion present in the solution and $z_i$ is its charge.

Aggressive environments can alternatively or additionally have high concentrations of divalent and/or multivalent ions, for example, as defined by an RMD value. The RMD value is the ratio of monovalent to divalent (or multivalent ions). The RMD of the solution, expressed as the square route molarity, can be calculated by the equation below, where $M_M$ and $M_D$ are the total molarity of monovalent and divalent cations in the solution respectively. The RMD of the solution, expressed as the square route molarity, can be calculated by Formula 2, below:

$$RMD = \frac{M_M}{\sqrt{M_D}}, \quad \text{Formula 2}$$

wherein $M_M$ and $M_D$ are the total molarity of monovalent and divalent cations in the solution respectively. Aggressive environments have low RMD values, for example, less than 0.7, especially less than 0.5 and particularly less than 0.1. Divalent and other multivalent ions bridge the platelets of a clay, preventing the clay from swelling and forming a hydraulic barrier. Thus, in environments having low RMD values, clay barriers cannot properly function without prehydration to swell the clay. Should the clay eventually dry out during use, the barrier would become significantly more permeable and the clay would not reswell due to the effects of the water having a high concentration of divalent or multivalent ions.

Figure 1:
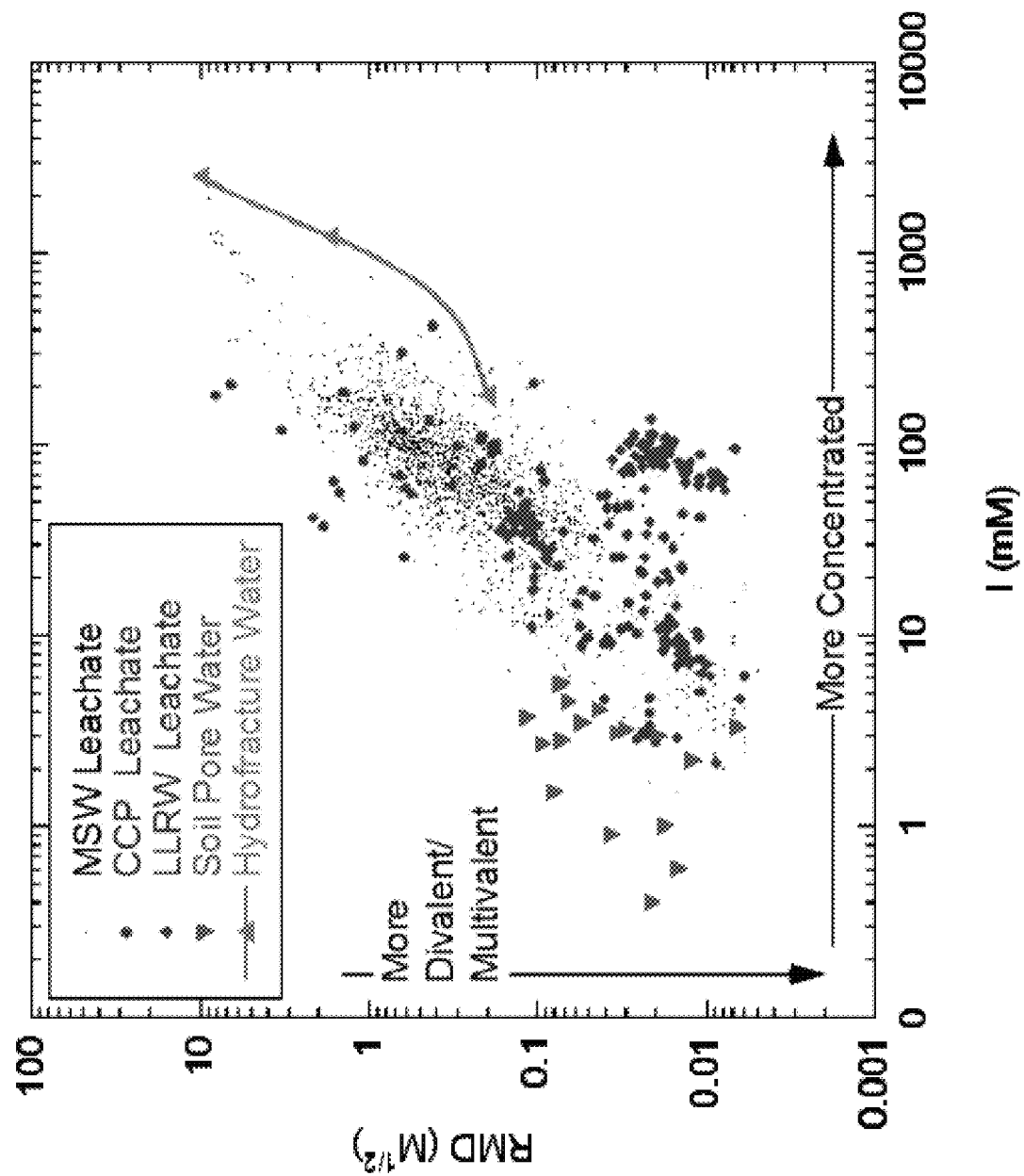
FIG. 1 is a graph illustrating the RMD and ionic strength of various aggressive environments to clay-based hydraulic barriers

In some embodiments, the aggressive environment includes high concentrations of calcium chloride, for example, calcium chloride concentrations of 50 mmol or greater. The aggressive environment can have a calcium chloride concentration, for example, of 50 mmol or greater, 100 mmol or greater, 150 mmol or greater, 200 mmol or greater, 250 mmol or greater, 300 mmol or greater, 350 mmol or greater, 400 mmol or greater, 450 mmol or greater, and 500 mmol or greater. FIG. 1 graphically illustrates the RMD and ionic strength of various aggressive environments as compared to soil pore water (a generally non-aggressive environment). As shown in FIG. 1, municipal solid waste (MSW) presents an aggressive environment to clay-based barriers in that it generally has an ionic strength of about 100 mM. Low level radioactive waste (LLRW) also presents an aggressive environment to clay-based barriers as it has an RMD value of less than 0.5. Coal Combustion Products (CCP) is yet another aggressive environment for clay-based barriers, having high ionic strength and low RMD values. Hydrofracture water is an example of an aggressive environment having high ionic strength. For example, the hydraulic barriers of the disclosure can be used as barrier for mining leachates, which can include, for example, calcium chloride, hydrochloric acid, sulfuric acid, cyanide salts, and can be caustic for example, sodium hydroxide.

Hydraulic barriers in accordance with embodiments of the disclosure can provide reduced permeability (improved performance) to a leachate per unit weight of hydraulic barrier as compared to conventional liners or hydraulic barriers such as geosynthetic clay liners (GCLs) and as compared to polymer only containing hydraulic barrier, at least in aggressive environments. For example, hydraulic barriers in accordance with embodiments of the disclosure can have a hydraulic conductivity in aggressive environments of $1 \times 10^{-7}$ cm/sec or less, for example, $1 \times 10^{-10}$ cm/sec or less. The terms "permeability" and "hydraulic conductivity" are used herein interchangeable. Aggressive environments can include, for example, an RMD value of less than about 50 $M^{1/2}$ and/or an ionic strength of about 0.02 mol/liter to about 3 mol/liter, or about 0.5 mol/liter to about 1.2 mol/liter. For example, the leachates can have an RMD value of less than about 50, 40, 30, 20, 10, or 5 $M^{1/2}$. The aggressive leachate can have an ionic strength, for example, of about 0.2 mol/liter to about 2.8 mol/liter, about 0.3 mol/liter to about 2.7 mol/liter, about 0.4 mol/liter to about 2.5 mol/liter, about 0.5 mol/liter to about 2.3 mol/liter, about 0.7 mol/liter to about 2.1 mol/liter, about 0.9 mol/liter to about 1.9 mol/liter, about 1 mol/liter to about 1.7 mol/liter, about 1.3 mol/liter to about 1.5 mol/liter. Other ionic strengths of exemplary leachates can include, for example, about 0.3, 0.4, 0.5, 0.6, 0.7, 0.8, 0.9, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, and 3 mol/liter. The hydraulic barriers of the disclosure can also be suitable for non-aggressive environments.

The hydraulic barriers in accordance with embodiments of the disclosure can be used for geo-environmental applications such as water (or leachate) absorption, water (or leachate) retention, and water (or leachate) containment, and particularly in such industries in which the water (or leachate) is present in an aggressive environment, such as, for example, in mining and/or gold extraction operations. For example, the hydraulic barriers in accordance with embodiments of the disclosure may have particular use in landfill caps, fraq water storage ponds, coal ash containment ponds, low pH heap leach pads, high-pH mine solutions, and waters containing elevated salt levels (chlorides, sulfates). The hydraulic barrier in accordance with embodiments of the disclosure can also be useful in below grade water proofing, such as underground parking garages, shopping malls, and the like to prevent ground water intrusion; waste landfills; man-made bodies of water; and other geo-environmental applications where a low-permeability hydraulic barrier is needed. In general, the hydraulic barriers of the disclosure can be disposed in contact with a leachate or in a region suspected to be in contact with a leachate to thereby contain the leachate.

A hydraulic barrier composition in accordance with embodiments of the disclosure includes granules containing a water-swellable clay and a polymer that is activated by water. As used herein, "granules" refers to particles of a powder or granulation. The granules can have an average diameter of about 10 microns or greater.

The granules are advantageously activated rapidly by contact with water, including water present in aggressive environments. For example, when the granules are contacted with water, at least a portion of the polymer rapidly dissolves or disperses in water to provide a more immediate hydraulic barrier response, at least as compared to conventional clay-based systems in aggressive environments. The polymer can be a water-soluble or water-dispersible polymer that is activated by water by dissolving or dispersing when contacted with water. The polymer can have a wide distribution of high and low molecular weights, and generally has a low molecular weight component (also referred to herein as "low molecular weight polymer chains") and a high molecular weight component (also referred to herein as "high molecular weight polymer chains"). As used herein, low molecular weight polymer chains may also include oligomers. Without intending to be bound by theory, it is believed that a portion of the polymer initially and rapidly (at least as compared to the high molecular weight polymer component) is solvated by the aqueous leachate upon contact with the leachate to provide a temporary barrier that allows sufficient time for the larger molecular weight portion to activate. It is believed that the low molecular weight polymer chains and/or oligomers, which are more water soluble by virtue of their lower molecular weight, dissolve and disperse upon contact with water and travel through and become temporarily entrapped in the clay pores, around clay platelets at clay platelet edges, and/or between adjacent platelets, temporarily blocking water or other leachate from traveling through the hydraulic barrier. It is further theorized that the polymer produced by the polymerization in the presence of clay may have a greater activity than polymers produced by traditional methods. The low molecular weight polymer may also interact with other low molecular weight polymers or high molecular weight polymers to form covalent or non-covalent bonds to further promote entrapment or clogging.

Figures 13A, 13B:
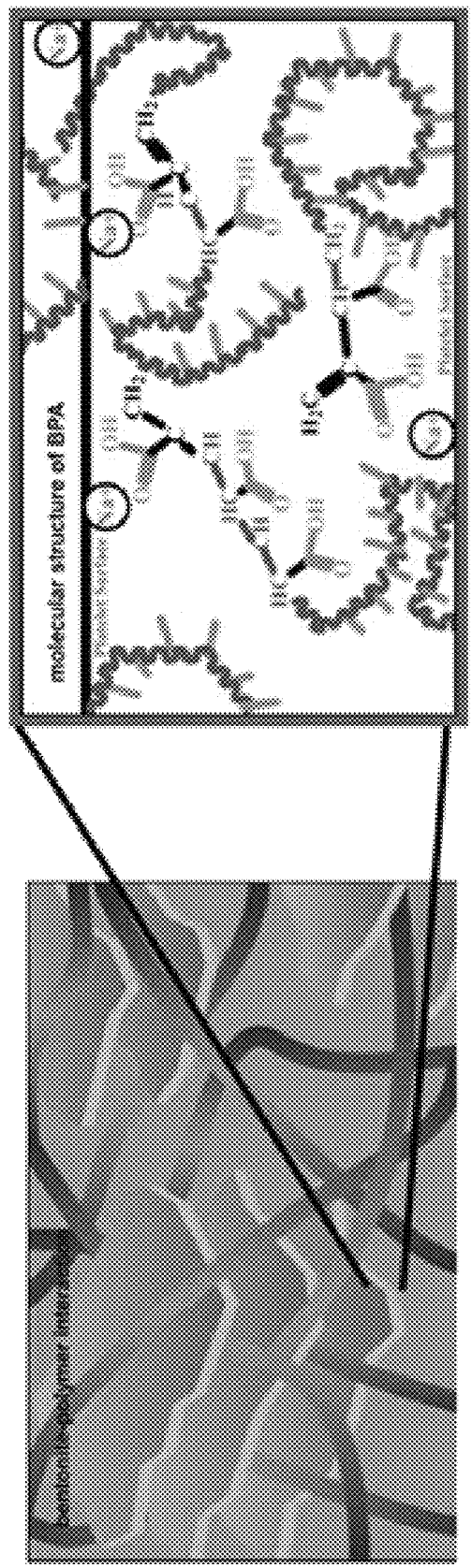
FIG. 13A is a schematic illustration of the structure of clay-polymer polymer granule in accordance with an embodiment of the disclosure.
FIG. 13B is a schematic illustration of the molecular structure of a clay-polymer composition in accordance with an embodiment of the disclosure.

This temporary blocking is particularly advantageous in aggressive environments because the clay cannot swell to prevent passage of water in such environments. While the low molecular weight polymer chains may only be temporarily trapped in the clay pores, at the edges of the clay platelets, and/or between clay platelets, this initial response provided by the low molecular weight polymer chains provide sufficient time for the high molecular weight polymer chains to dissolve or disperse in water and become entrapped in the clay pore, at the edges of the clay platelets, between clay platelets, and any other such water passageways of the hydraulic barrier, thereby provide a more permanent and long-lasting hydraulic barrier. A schematic illustration of the polymer-clay interaction and the molecular structure of clay-polymer granules in accordance with the invention are provided at FIG. 13.

Another possibility is that the linear or lightly branched (or cross-linked) polymers may form covalent or non-covalent bonds with the clay promoting entrapment. In calcium-rich and other multivalent-rich environments, for example, it is believed that the polymer chains that initially dissolve and disperse upon contact with water, cross-link and associate with the calcium or other multivalent ions. Ionic crosslinking in the presence of a multivalent ions, such as calcium, can result in formation of a gel that can coat the clay platelets and block clay pores, thereby improving the barrier properties of the hydraulic barrier. The polymer can also function to reduce the concentration of the divalent and other multivalent ions in the system, which may otherwise bridge clay platelets and prevent the clay from swelling. Thus, in some aggressive environments, it is believed that the polymer can improve the ability of the clay to swell by withdrawing at least some of the divalent or multivalent ions from the system. The polymer can also help functionality by absorbing the aggressive leachate and improving the swell of the system. Accordingly, the hydraulic barrier of the disclosure advantageously provides a barrier that can be used in aggressive environments without the need to pre-swell the clay by pre-hydrating with fresh water.

It is further believed that the polymer at least partially coats and protects the clay platelets, thereby allowing for use of the clay-based granules in environments typically harmful and/or destructive to clay. For example, upon activation, the polymer can protect the clay platelets from harmful exfoliation when exposed to acidic environments.

The hydraulic barrier composition can further include granulated water-swellable clay mixed with the clay-polymer granules. For example, the mixture can include at least 0.5 weight percent (wt. %) of the clay-polymer granules based on the total weight of the mixture. The advantages of the clay-polymer granules, including resistance and impermeability to aggressive environments, can be achieved with the mixture. In such a hydraulic barrier, the clay-polymer granules represent a significantly more expensive component, particularly when compared to granulated water-swellable clay. Thus, the mixture beneficially allows for production of a hydraulic barrier for aggressive environments at lower cost. The delivery of the polymer blend predispersed in a clay-polymer granule can also help to match the specific gravity of the clay if the product is to be blended, which can prevent segregation in handling equipment and help to maintain a consistent distribution of the polymer in the blend.

Water-Swellable Clay

The water-swellable clay of the clay-polymer granules and/or the granulated clay can be, for example, a water-swellable smectite clay. Examples of suitable water-swellable clays include, but are not limited to, montmorillonite, saponite, nontronite, laponite, beidellite, iron-saponite, hectorite, sauconnite, stevensite, vermiculite, and mixtures thereof. For example, the clay can be a smectite clay, such as sodium smectite clay, calcium smectite clay, sodium activated smectite clay, and preferably sodium montmorillonite and sodium bentonite.

The clay can be about 10 wt % to about 99 wt % based on the totally weight of the granules. Other suitable ranges include about 15 wt % to about 85 wt %, about 20 wt % to about 80 wt %, about 30 wt % to about 70 wt %, about 40 wt % to about 60 wt %, and about 20 wt % to about 50 wt %. For example, the clay can include about 10, 15, 20, 24, 30, 35, 40, 45, 50, 55, 60, 65, 70, 75, 80, 85, 90, or 99 wt % based on the total weight of the granules.

Other non-water-swellable clays or fillers can also be added to the granules and/or can be added to the composition separately, for example, as filler granules. Such clays and fillers include, for example, calcium carbonate, talc, mica, vermiculite, acid activated clays (where a hydrogen ion has replaced the sodium), kaolin, silicon dioxide, titanium dioxide, calcium silicate, calcium phosphate, alumina, fly-ash, silicon carbide, lignite, silica sand, recycled glass, calcium sulfate, cement and mixtures thereof. These clays and fillers can be added in any suitable amount such that the hydraulic barrier composition comprises at least 0.5 wt % of the clay-polymer granules.

Polymer

The polymer chains of the polymer-clay granules generally have a linear or a lightly-branched structure. For example, the granules can include a polymer system having a cross-linked polymer portion and a linear polymer portion. The polymer system of the granules can have a wide molecular weight distribution and can include both high molecular weight polymer chains and low molecular weight polymer chains. The average molecular weight of the polymer system can be about 300,000 g/mol. The low molecular weight polymer chains have a sufficiently low molecular weight to activate quickly in water, for example, by dissolving or dispersing in the water, upon contact with water. Once dissolved or dispersed, the low molecular weight polymer chains can become temporarily entrapped in the clay pores, at the edges of the clay platelets, and between clay platelets to provide the hydraulic barrier with an initial impermeability to water. The low molecular weight polymer chains, however, have a sufficiently low molecular weight such that ultimately these polymer chains flow through the clay. The low molecular weight polymer chains can have a molecular weight, for example, of about $6 \times 10^5$ g/mol or less. Other molecular weights may be suitable so long as the low molecular weight polymer activates upon contact with water such that the low molecular weight polymer component quickly dissolves or disperses in water and may ultimately pass between hydrated clay granules. For example, the clay-polymer granules can have a low molecular weight components such that at least 5% of the available low molecular weight polymer can pass out of the granule after about 24 hrs. Additionally, those polymers can also be capable of interacting with other polymer chains through covalent or non-covalent bond formation to retard their passage between the hydrated clay granules.

While the impermeability provided by the low molecular weight polymer chains may be temporary, it is substantially simultaneous with contact of the hydraulic barrier with water and provides sufficient time for the high molecular weight polymer chains to dissolve or disperse in the water and become entrapped in the clay pores, about and between the clay platelets, and any other water passages ways of the hydraulic barrier to provide a permanent hydraulic barrier having low permeability even in aggressive environments. The high molecular weight polymer chains have a sufficiently high molecular weight such that they are entrapped by the clay and do not pass through with as an effluent. For example, the high molecular weight polymer chains can have a molecular weight about greater than $6 \times 10^5$ g/mol. In some embodiments, the high molecular weight polymer chains may have a molecular weight in a range of about $6 \times 10^5$ g/mol to about $1 \times 10^7$ g/mol.

The polymer can be formed from any organic monomer(s) able to be polymerized to provide a water-soluble or water-dispersible polymer. For example, the organic monomer can have the following structural formula:

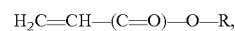

wherein R is selected from the group consisting of an alkali metal, H, $CH_3$, $CH_2CH_3$, $CH(CH_3)_2$, and mixtures thereof.

For example, the monomer can be selected from the group consisting of acrylic acid, acrylamide, an alkali metal acrylate, such as sodium acylate, or other functional monomers such as glycols, amines, alcohols, and organic salts, and mixtures thereof. Suitable monomers, include, for example, alkylacrylamides, methacrylamides, styrenes, allylamines, allylammonium, diallylamines, diallylammoniums, alkylacrylates, methacrylates, acrylates, n-vinyl formamide, vinyl ethers, vinyl sulfonate, acrylic acid, sulfobetaines, carboxybetaines, phosphobetaines, and maleic anhydride, and mixtures thereof. For example, the mixtures can include 50-90 mole percent of an alkali metal acrylate and 10-50 mole percent acrylic acid, or 65-85 mole percent of an alkali metal acrylate and 15-35 mole percent acrylic acid, based on the total moles of polymerizable acrylic acid monomer.

In various embodiments, the polymer can be a sulfonated water-soluble polymer. For example, the polymer can be acrylamido-methyl-propane sulfonate (AMPS). Embodiments of the disclosure in which the hydraulic barrier composition contains an sulfonated water-soluble polymer can advantageously be suitable for containing leachates have a pH of less than 1.5 and an ionic strength of about 0.1 mol/liter to about 10 mol/liter. Such embodiments are also suitable for containing other aggressive leachates, as described above. Clay-polymer granules containing an AMPS polymer advantageously and unexpectedly demonstrate good free swell, with low fluid loss when exposed to aggressive leachates, such as a nickel leachate.

Method of Making the Hydraulic Barrier Composition

A method of forming a hydraulic barrier composition in accordance with embodiments of the disclosure can include forming a polymerizable mixture or slurry by mixing clay and an organic monomer. The mixture can further include cross-linking agent, neutralizing agents, inhibitors and additional additives, if desired. A polymerization initiator or polymerization catalyst can then be added to the polymerizable mixture. The resulting mixture is then subjected to conditions sufficient to completely polymerize the monomer and form a polymerized cake of material. The resulting product is then granulated or crushed into a granular or powder to form the clay-polymer granules. Any known granulation or powder forming methods may be used to process the polymerized cake into the clay-polymer granules.

In various embodiments, the monomer is polymerized in the presence of a cross-linking agent. Any cross-linking agent compatible with the organic monomer and capable of, and suitable for, cross-linking the organic monomer may be used. For example, the cross-linking agent can be phenol formaldehyde, terephthaladehyde, N,N'-methyl bisacrylamide (MBA), and mixtures thereof.

Any amount of the cross-linking agent or any ratio of the cross-linker to the monomer sufficient to cross-link the monomer to the desired degree may be used. In some embodiments, the monomer is polymerized without the use of a cross-linking agent. The amount or ratio of cross-linking agent use will vary depending upon, among other factors, the desired characteristics or properties of the hydraulic barrier, including its water-absorbing capacity and its ability to rapidly activate in the presence of water. For example, it has been found that as the ratio of the cross-linking agent to the monomer is increased, the availability of free water soluble polymer decreases. Additionally, the water solubility of the resulting absorbent polymer and the water absorbing capacity of the absorbent polymer tend to decrease. In some embodiments, a sufficient amount of cross-linker may be needed to provide the desired molecular weight distribution and the desired portion of high molecular weight polymer chains. The amount of cross-linking agent can be used as one factor for tailoring the desired response of the resulting hydraulic barrier. For example, the molar ratio of cross-linking agent to monomer can be about 1:100 to about 1:2000, about 1:500 to about 1:2000, about 1:700 to about 1:1800, about 1:800 to about 1:1600, about 1:900 to about 1:1400, or about 1:1000 to about 1:1500.

For example, in one embodiment, a method of forming the clay-polymer granules includes mixing the organic monomer with water and a neutralizing agent, such as sodium hydroxide. For example, the organic monomer, water, and neutralizing agent can be mixed prior to the addition of the clay to form a polymerization solution in order to more easily effect neutralization of at least a portion of the polymerizable organic monomer or monomers. For example about 65-85 mole percent of the organic monomer can be neutralized before clay addition. Preferably, a cross-linking agent can also be added. The organic monomer, water, neutralizing agent, and cross-linking agent can be mixed to form a homogenous or substantially homogenous polymerization solution prior to adding the clay to from the polymerizable mixture. By forming such a homogenous or substantially homogenous polymerization solution prior to addition of the clay, it may be possible to obtain improved consistency and homogeneity in intercalation of the clay. However, in alternative embodiments, the clay can be added without forming such a homogenous or substantially homogenous mixture.

The clay can be added to the polymerization solution to form the polymerizable mixture in any manner. In various embodiments, the polymerization mixture containing the clay is sheared during mixing, which can intercalate a portion of the organic monomer between clay platelets to partially exfoliate the clay platelets prior to, or simultaneously with, polymerization.

The degree of mixing of the polymerizable mixture can depend upon the desired characteristics of the resulting mixture. For example, the clay may be simply combined together with the polymerization monomer, initiator, and optional additives, without regard for the degree of mixing or homogeneity of the resulting mixture. In various embodiments, however, the mixture is mixed to form a substantially homogenous or homogenous mixture.

Any mixer and any mixing method may be used which are capable of mixing the clay and the monomer to achieve the desired characteristics of the slurry. The mixing step may be performed for any period or length of time sufficient to achieve the desired characteristics of the slurry. For example, the mixing step may be performed for a sufficient length of time to mix the clay and the polymerizable solution such that the resulting mixture is homogenous or substantially homogenous.

The monomer is polymerized using a polymerization catalyst or initiator and conditions sufficient to promote polymerization. The polymerization catalyst or initiator can be any suitable initiator or catalyst depending on the monomer(s) chosen. For example, the initiator can be a persulfate type of initiator, such as sodium persulfate. In one embodiment, the monomer is acrylic acid and the initiator is sodium persulfate. The initiator is provided in an amount sufficient for complete polymerization of the monomer. Once the polymerizable mixture is formed, it is contacted with a polymerization catalyst or initiator and subjected to conditions sufficient to polymerize the mixture. For example, in one embodiment, the polymerizable mixture combined with a polymerization catalyst or polymerization initiator is transferred to a suitable receptacle and heated to a temperature sufficient to polymerize the monomer.

Additives can be incorporated to the mixture prior to polymerization and/or attached to the polymer backbone to promote the attachment of the polymer chains to the surface of the clay platelets. In some embodiments one or more additives can be attached to the polymer backbone post-polymerization. The additives can include, for example, phosphonium salts, quarternary amine salts, alkyl and aryl-silanes, alcohols, glycols, amines and combinations thereof.

Preferably, the temperature for polymerization is near or is raised during polymerization to be near than the boiling point of water so that the water is removed from the polymerizable mixture during heating. For example, the polymerizable mixture can be heated to a temperature in a range of about 100° C. to about 150° C., about 150° C. to about 240° C., about 160° C. to about 230° C., about 170° C. to about 220° C., about 180° C. to about 210° C., about 190° C. to about 200° C. Other suitable temperatures include, for example, about 100, 110, 120, 130, 140, 150, 160, 170, 180, 190, 200, 210, 220, 230, and 240° C. Other suitable energies can be used for initiation, such as, for example, UV, IR, ionizing radiation, and redox reactions.

When heating is used, the polymerizable mixture can be heated any suitable amount of time to effect polymerization. For example, the polymerizable mixture can be heated for about 1 minute to about 30 minutes, about 5 minutes to about 25 minutes, about 8 minutes to about 20 minutes, and about 10 minutes to about 15 minutes. Other suitable times include, about 1, 2, 3, 4, 5, 6, 7, 8, 9, 10, 12, 14, 16, 18, 20, 22, 24, 26, 28, and 30 minutes.

Any heater and any heating process may be used which are capable of heating the mixture to polymerize the monomer. For example, the polymerizable mixture can be passed through an over for heating. The polymerizable mixture can be passed through the oven at any suitable rate capable of effecting polymerization of the monomer. For example, the polymerizable mixture can be passed through the oven at a belt speed of about 5 ft/min to 30 ft/min, about 10 ft/min to 20 ft/min, about 5 ft/min to 10 ft/min, or about 15 ft/min to 30 ft/min. Other suitable rates include about 5, 6, 7, 8, 9, 10, 11, 12, 13, 14, 15, 16, 17, 18, 19, 20, 21, 22, 23, 24, 25, 26, 27, 28, 29, and 30 ft/min.

In some embodiments, the polymerized mixture is maintained at an elevated temperature after the heating step. The elevated temperature is equal to or greater than the temperature of the heating step. The polymerized mixture can be maintained at the elevated temperature, for example, to remove any excess water from the polymerized mixture prior to granulation. For example, the elevated temperature can be in a range of about 150° C. to about 250° C., about 175° C. to about 200° C., about 180° C. to about 230° C., about 195° C. to about 215° C., about 200° C. to about 250° C. Other suitable temperatures include, for example, about 150, 155, 160, 165, 170, 175, 180, 185, 190, 195, 200, 205, 210, 215, 220, 225, 230, 235, 240, 245, and 250° C.

The polymerized mixture can be maintained at the elevated temperature after the heating step for any suitable amount of time. For example, the polymerized mixture can be maintained at the elevated temperature for about 0.5 minutes to about 30 minutes, about 10 minutes to about 25 minutes, about 7 minutes to about 30 minutes, about 12 minutes to about 20 minutes, about 14 minutes to about 18 minutes, or about 15 minutes to about 30 minutes. Other suitable times include about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 minutes.

Without intending to be bound by theory, it is believed that polymerization of the polymer in the presence of the clay can beneficially improve the desired structure of the polymer—that is provide polymers having linear or lightly-branched structures. It is believed that the clay acts as a template for the growing polymer chains and cross-linked structures. The interaction of the monomer and the clay may impart a more active product. Thus, it was unexpectedly discovered that polymerization of the monomer and cross-linker in the presence of the clay beneficially provides a higher amount of mobile linear and lightly-branched or cross-linked structures, which in turn has been determined as more desirable for providing rapidly activating hydraulic barriers.

The polymerized mixture can then be granulated or crushed into a granular or powder to form the clay-polymer granules. The polymer may be sheared during the granulation process, which can assist in providing clay-polymer granules having polymer chains with linear or lightly branched polymer structures. The granules can have any suitable size, which may, for example, depend upon the end use and/or application method for incorporation into a substrate. For example, the granules can have an average diameter of about 10 microns or greater. In some embodiments, at least 80% of the granules, by number, have a size in a range of about 5 mesh to about 325 mesh, about 10 mesh to about 300 mesh, about 20 mesh to about 200 mesh, about 14 mesh to about 200 mesh, about 14 mesh to about 80 mesh, about 25 mesh to about 100 mesh, about 50 mesh to about 200 mesh, about 75 mesh to about 175 mesh, about 100 mesh to about 150 mesh, about 75 mesh to about 100 mesh, and about 6 mesh to about 50 mesh. Other suitable sizes include about 5, 6, 7, 8, 9, 10, 12, 14, 16, 18, 20, 22, 24, 26, 28, 30, 32, 34, 36, 38, 40, 42, 44, 46, 48, 50, 60, 70, 80, 90, 100, 110, 120, 130, 140, 150, 160, 170, 180, 190, 200, 225, 250, 275, 300, and 325 mesh.

It has been advantageously and unexpectedly discovered that the properties of the resulting hydraulic barrier, including the speed at which the barrier activates in aggressive environments, can be tailored by tailoring one or more of the processing parameters for forming the clay-polymer granules, such as the amount of cross-linking agent and the temperature at which the polymerizable mixture is polymerized. For example, a higher activity was observed and a rapidly activating hydraulic barrier can be produced using a small amount of cross-linking agent, and a lower temperature. The temperature must, however, be sufficiently high to polymerize the monomer and drive off substantially all of the moisture from the polymerized product. Without intending to be bound by theory, it is believed that adjustment of the polymerization conditions, such as the amount of cross-linking agent and the temperature of polymerization, results in changes in the structure of the polymers (i.e., linear or branched structures) and the molecular weight distribution and particularly the content of low molecular weight polymer chains able to activate rapidly when contacted with water to provide a substantially immediate impermeability to water.

In some embodiments, a pre-synthesized polymer or polymer mixture can be added to the clay instead of formation of the polymer in the presence of the clay. Any polymers based on the monomers described above may be used. The pre-synthesized polymer or polymer mixture has a wide molecular weight distribution. For example, a high molecular weight polymer and a low molecular weight polymer can be combined and mixed with the clay to form the clay-polymer granules. For example, a high molecular weight pre-synthesized polymer can have an average molecular weight of greater than $1 \times 10^6$ g/mole. For example, a low molecular weight pre-synthesized polymer can have an average molecular weight of about 100,000 to about 300,000, about 150,000 to about 250,000, or about 200,000 to about 250,000. The low molecular weight polymer can have a polydispersity index in a range of about 1 to about 7, about 2 to about 6, about 3 to about 5. Other suitable values of the polydispersity index include, for example, about 1, 2, 3, 4, 5, 6, and 7. The high molecular weight polymer can also have a polydispersity index in a range of about 1 to about 7, about 2 to about 6, about 3 to about 5. Other suitable values of the polydispersity index include, for example, about 1, 2, 3, 4, 5, 6, and 7. The high molecular weight polymer can be lightly crosslinked.

The pre-synthesized polymer can be about 0.07 wt % to about 70 wt. % of the clay-polymer mixture, based on the total weight of the mixture. Other suitable amounts include about 0.1 wt. % to about 70 wt. %, about 10 wt. % to about 60 wt. %, about 20 wt. % to about 40 wt. %, about 30 wt. % to about 70 wt. %, about 1 wt. % to about 10 wt. %, about 0.5 wt % to about 3 wt. %, 0.1 wt % to about 0.5 wt %, about 0.1 wt % to about 1 wt %, about 0.2 wt % to about 4 wt %, about 0.4 wt % to about 3 wt %, or about 0.6 wt % to about 2 wt %, based on the total weight of the mixture. Other suitable amounts include about 0.07, 0.1, 0.2, 0.3, 0.4, 0.5, 0.6, 0.7, 0.8, 0.9, 1, 5, 10, 15, 20, 25, 30, 35, 40, 45, 50, 55, 60, 65, and 70 wt. %.

For example, where a mixture of high and low molecular weight polymers are used, each of the polymers can be provided, for example, in the amounts provided above. In one embodiment, the low molecular weight polymer concentration is about 25 wt. % to about 70 wt. % based on the total weight of the polymer in the clay-polymer granules. In another embodiment, the low molecular weight polymer is about 40 wt. % to 60 wt. % based on the total polymer in the clay-polymer granules.

Dry polymer powders or granules can be added directly to the clay. Alternatively, a slurry of the polymers and clay can be predispersed in water, dried and granulated or ground to a powder. The powder can then be used in the hydraulic barrier.

In some embodiments, the hydraulic barrier composition consists essentially of the clay-polymer granules. In other embodiments, the hydraulic barrier composition can include a combination of the clay-polymer granules and additional filler granules, such as clay granules. Any suitable granular clays can be used, such as the water-swellable clays described above. The filler granules can include any suitable filler including, for example, calcium carbonate, talc, mica, vermiculite, acid activated clays (where a hydrogen ion has replaced the sodium), kaolin, silicon dioxide, titanium dioxide, calcium silicate, calcium phosphate, alumina, fly-ash, silicon carbide, silica sand, lignite, recycled glass, calcium sulfate, cement and mixtures thereof. The composition can further include such fillers in non-granular form. Additionally, the composition can include additional polymers, not included in the clay-polymer granules. For example, the composition can include a super absorbent polymer. Suitable additional polymers can include, for example, alkylacrylamides, methacrylamides, styrenes, allylamines, allylammonium, diallylamines, diallylammoniums, alkylacrylates, methacrylates, acrylates, n-vinyl formamide, vinyl ethers, vinyl sulfonate, acrylic acid, sulfobetaines, carboxybetaines, phosphobetaines, and maleic anhydride and mixtures and copolymers thereof.

The hydraulic barrier can include at least 0.25 wt % of clay-polymer granules based on the total weight of the hydraulic barrier composition. The remaining weight percent can be granular clay or a mixture of granular clays. Other suitable amount of clay-polymer granules when combined with additional clay can include about 0.25 wt % to about 100 wt %, about 0.5 wt. % to about 95 wt %, about 1 wt % to about 80 wt %, about 5 wt % to about 70 wt %, about 10 wt % to about 60 wt %, about 15 wt % to about 50 wt %, about 20 wt % to about 40 wt %, about 0.5 wt % to about 5 wt %, about 1 wt % to about 10 wt %, about 2 wt % to about 8 wt %, about 2 wt % to about 6 wt %, or about 1 wt % to about 5 wt %. Other suitable amounts of clay-polymer granules include about 0.25, 0.3, 0.35, 0.4, 0.45, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 12, 14, 16, 18, 20, 25, 30, 35, 40, 45, 50, 55, 60, 65, 70, 75, 80, 85, 90, 95, and 100 wt %.

Method of Making the Hydraulic Barriers

A hydraulic barrier can be formed by incorporating the hydraulic barrier composition into a substrate, for example, a geotextile. The hydraulic barrier composition can be incorporated and retained in a substrate using any known methods, for example, needle punching, stitching, chemical binding, adhesive binding, and combinations thereof. For example, the hydraulic barrier can be formed by needle punching from 10,000 strikes/ft$^2$ to about 2,400 strike/ft$^2$. In various embodiments, granules having a larger mesh size, for example, in a range of 5 to 200 mesh, can be used when needle punching is used. Use of the larger granule size when needle punching is used can advantageously provide improved performance. Without intending to be bound by theory it is believe that the larger granules can more effectively clog passageways formed by the needling punching operation. In various embodiment, hydraulic barriers formed using needle punching include at least about 4% claypolymer granule loading. Without intending to be bound by theory, it is believe that additional loading of the claypolymer granules can be advantageous when needle punching to block passages formed by the needle punching and needle bundles. The substrate can be any substrate that is compatible with the hydraulic barrier composition. For example, the substrate can be a fibrous substrate. The substrate can be water-absorbent or water-adsorbent. The substrate can be formed from or include a geotextile material, including woven and non-woven geotextile materials. The geotextile materials can have any weight and formed from any material suitable for use in intended application of the hydraulic barrier, for example, in aggressive environments. The geotextile can have a unit weight of about 0.05 kg/m$^2$ to about 0.8 kg/m$^2$, about 0.1 kg/m$^2$ to about 0.4 kg/m$^2$, or about 0.1 kg/m$^2$ to about 0.2 kg/m$^2$.

Further, the geotextile material may be in any form compatible with providing the desired hydraulic barrier material in any size or shape to fit any area to be protected against substantial water contact. In one embodiment, the substrate is a substantially planar sheet comprising at least one layer of the geotextile material. Examples of suitable geotextile materials includes, but are not limited to, PETROMAT 4597, PETROMAT 4551, AND PETROMAT 4506, available from Amoco, GEO-4-REEMAY 60, a polyester material, available from Foss, Inc., and 25WN040-60, available from Cumulus Corp. The substrate can have any suitable thickness. For example, the GEO-4-REEMAY 60 material is available in 2 mm thickness, and the 25WN040-60 material is available in a 5 mm thickness.

The hydraulic barrier can include a coversheet and/or carrier sheet. The coversheet and/or carrier sheet can be a geotextile material. The coversheet and/or carrier sheet can be attached to the substrate using any known methods, such as those used in forming geosynthetic clay liners. For example, the hydraulic barrier composition can be needle punched, whereby fibers from an upper non-woven sheet material layer are displaced and secured to a lower non-woven sheet material layer, and fibers from the lower non-woven sheet material layer are displaced and secured to the upper non-woven sheet material layer. Any other suitable methods for adhering the coversheet can be used, such as stitching or use of an adhesive.

In some embodiments of the disclosure, the clay-polymer granules are provided as a layer separate from a granular bentonite layer. For example, a hydraulic barrier can be formed by forming a layer of the clay-polymer granules, for example, by embedding the clay-polymer granules in a substrate or using a sequential method to add the clay-polymer granules before or after the addition of the bentonite granules. The clay-polymer granules can be retained in a substrate using any suitable methods. Any suitable substrate can be used. Referring to FIG. 12B, the hydraulic barrier can then be formed by placing the clay-polymer granular layer before (in the direction of fluid flow) a layer of granular clay. The layer of granular bentonite can be formed in any way using any suitable substrate and methods of retaining the granular bentonite in the substrate. For example, in one embodiment, the clay-polymer granules are embedded in a coversheet of the hydraulic barrier. The granular clay is embedded into a lower sheet material of the hydraulic barrier and retained in the hydraulic barrier by needle punching the coversheet to the lower sheet material. In another embodiment, the granular bentonite and the clay-polymer granules can be separately formed into geocomposite mats using any suitable substrates and methods of forming the mats. The mats can then be assembled into a hydraulic barrier, wherein the clay-polymer granule-containing mat is placed before (in the direction of fluid flow) the granular clay-containing mat.

The following examples are provided for illustration and are not in any way intended to limit the scope of the invention.

EXAMPLES

Example 1

Formation of a Clay-Polymer Granular Composition

Clay-polymer granular compositions were formed using the ingredients and amounts shown in Table 1, below.

TABLE 1

Clay-Polymer Composite Composition

| | Material | Function | Amount (wt %) |
|---|---|---|---|
| CPC-1 | Acrylic Acid, 99% | Organic monomer | 11.41% |
| | N'N' Methylene-bisacrylamide, 99% (MBA) | Cross-linking agent | 0.03% |
| | Deionized water | Water | 38.90% |
| | 50% NaOH | Neutralizing agent | 9.5% |
| | Sodium Bentonite Clay | Clay | 38.76% |
| | 30% Sodium Persulfate in water | Initiator | 1.4% |
| | | Total | 100% |
| CPC-2 | Acrylic Acid, 99% | Organic monomer | 43.85% |
| | N'N' Methylene-bisacrylamide, 99% (MBA) | Cross-linking agent | 0.03% |
| | Deionized water | Water | 3.23% |
| | 50% NaOH | Neutralizing agent | 38.95% |
| | Sodium Bentonite Clay | Clay | 13.7% |
| | 30% Sodium Persulfate in water | Initiator | 0.24% |
| | | Total | 100% |

The MBA was dissolved into the acrylic acid and then diluted with the deionized water and neutralized with the NaOH solution. The clay was then added slowly while mixing using a Sterling Multimixer. The initiator was added and stirred using the Multimixer. About 1 liter of the slurry was placed into a 3 quart baking pan and heated to 190° C. for about 20 minutes. The temperature was then lowered to 110° C. and the polymerized mixture was allowed to remain at the elevated temperature overnight. The resulting material was then broken into smaller chunks and ground to form the clay-polymer granules. Table 2 provides various parameters of the slurry used to form the clay-polymer granules.

TABLE 2

Slurry Analysis

| | Feature | Percentage |
|---|---|---|
| CPC-1 | Weight percent of the polymer based on the total weight of the solids | 28.46 wt % |
| | Weight percent of the clay based on the total weight of the solids | 70.69 wt % |
| | Weight percent of the crosslinker based on the total weight of the polymer | 0.18 wt % |
| | Mole percent of the crosslinker to monomer | 0.10 mol % |
| | Weight percent of water based on the total weight of the slurry | 41.47 wt % |
| | Weight percent of solids based on the total weight of the slurry | 58.53 wt % |

Figure 2:
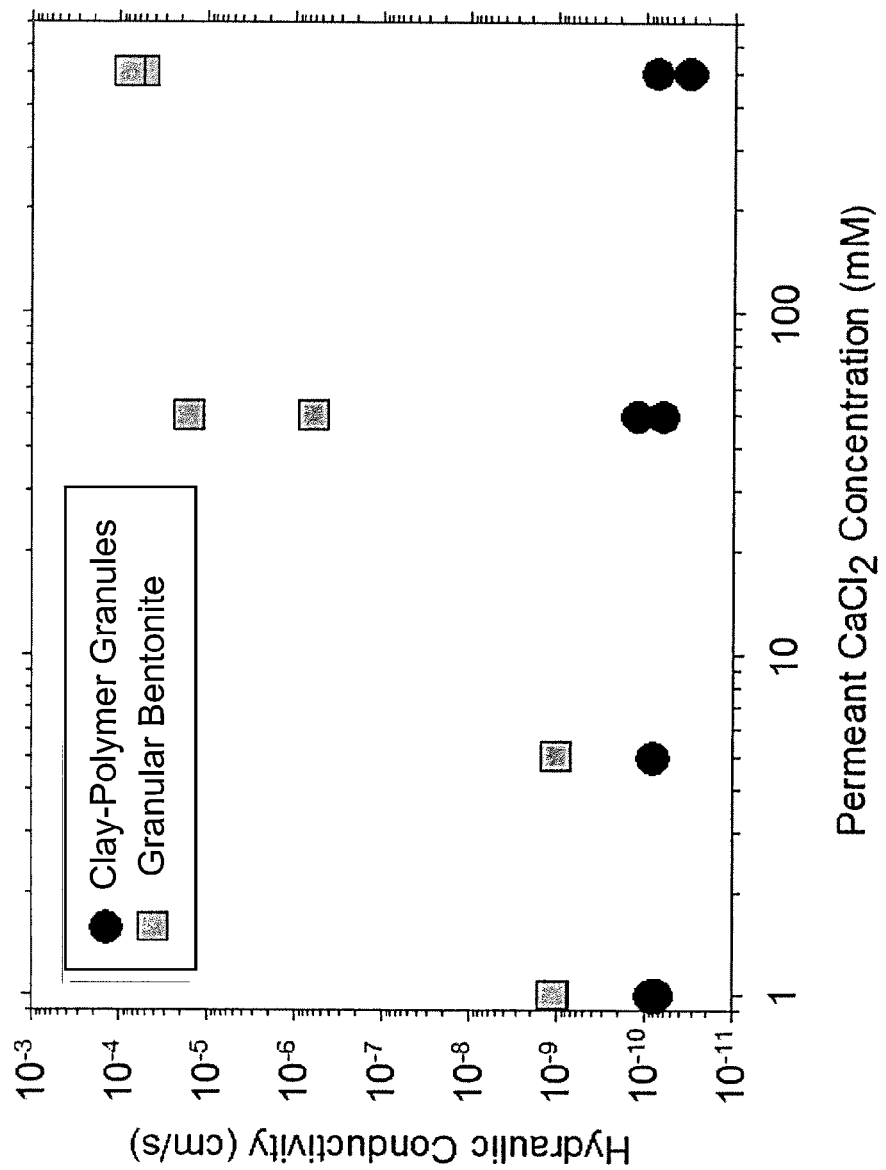
FIG. 2 is a graph illustrating the hydraulic conductivity as a function of permeate calcium chloride concentration for clay-polymer granules in accordance with an embodiment of the disclosure and conventional granular bentonite.

The granules were evaluated for permeability as compared to granular bentonite at varying calcium chloride ($CaCl_2$) concentrations (i.e., representing an aggressive environment). The permeability experiments were conducted according to ASTM D 5084 with an average effective stress of 20 kPa and a hydraulic gradient of 200. The concentration of calcium chloride of the permeate was increased from 1 to 500 mMol/liter. The hydraulic barrier was prehydrated in the CaCl$_2$ leachate solution. As shown in FIG. 2, the clay-polymer granules, tested by themselves, performed well against all permeate solutions, particularly as compared to the granular bentonite at calcium chloride concentrations of greater than 5 mMol/liter. The clay-polymer granules demonstrated a permeability of less than 1×10$^{-10}$ cm/sec. In some experiments, clogging of the permeameter lines was observed, resulting sudden decrease in permeability. It is believed that the released oligomer from the clay-polymer granules caused the clogging. All permeability measurements described herein have removed from consideration reduced permeability measurements during clogging.

Figure 3:
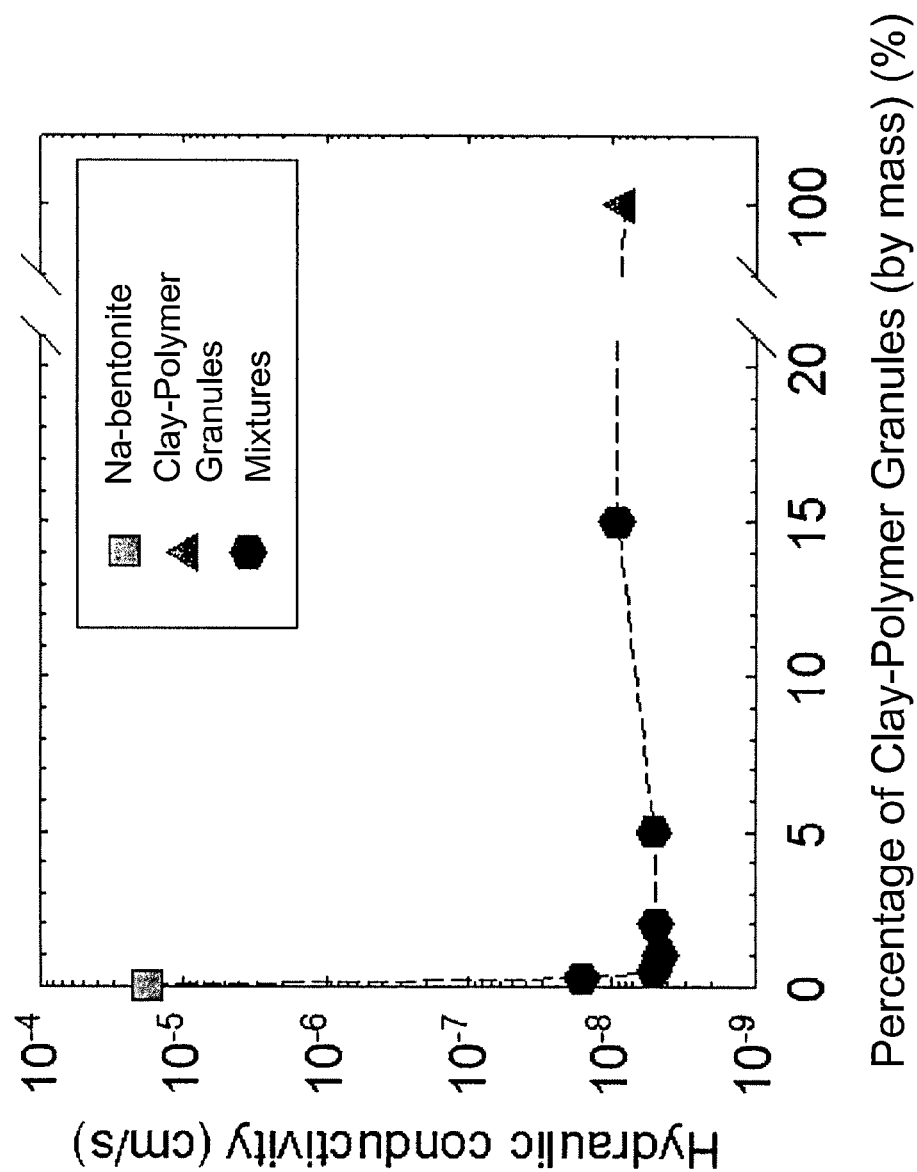
FIG. 3 is a graph illustrating the hydraulic conductivity as a function of percentage of clay-polymer granules for a mixture of granular bentonite and clay-polymer granules in accordance with an embodiment of the disclosure, permeated with a 50 mmol calcium chloride leachate.

As shown in FIG. 3, it was further demonstrated that the mixing granular bentonite with the clay-polymer granules at levels as low as 0.5 wt. % of the clay-polymer granules also demonstrated acceptably low permeability of less than 1×10$^{-8}$ cm/sec at calcium chloride concentrations up to 50 mMol/liter. The granular bentonite control, however, exhibited a permeability of 2×10$^{-5}$ cm/sec.

Figure 4A:
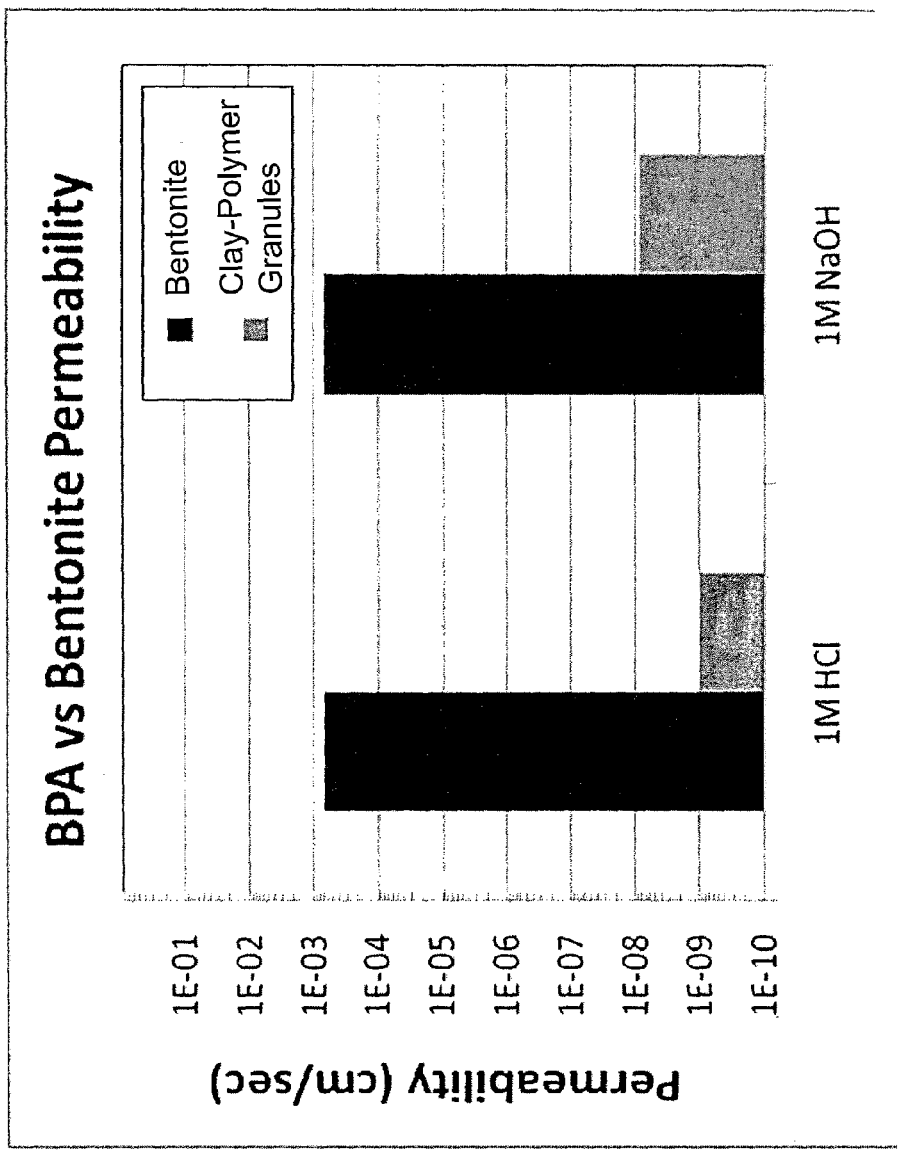
FIG. 4A is a graph illustrating the permeability as a function of permate pH for clay-polymer granules in accordance with an embodiment of the disclosure and conventional granular bentonite.
Figure 4B:
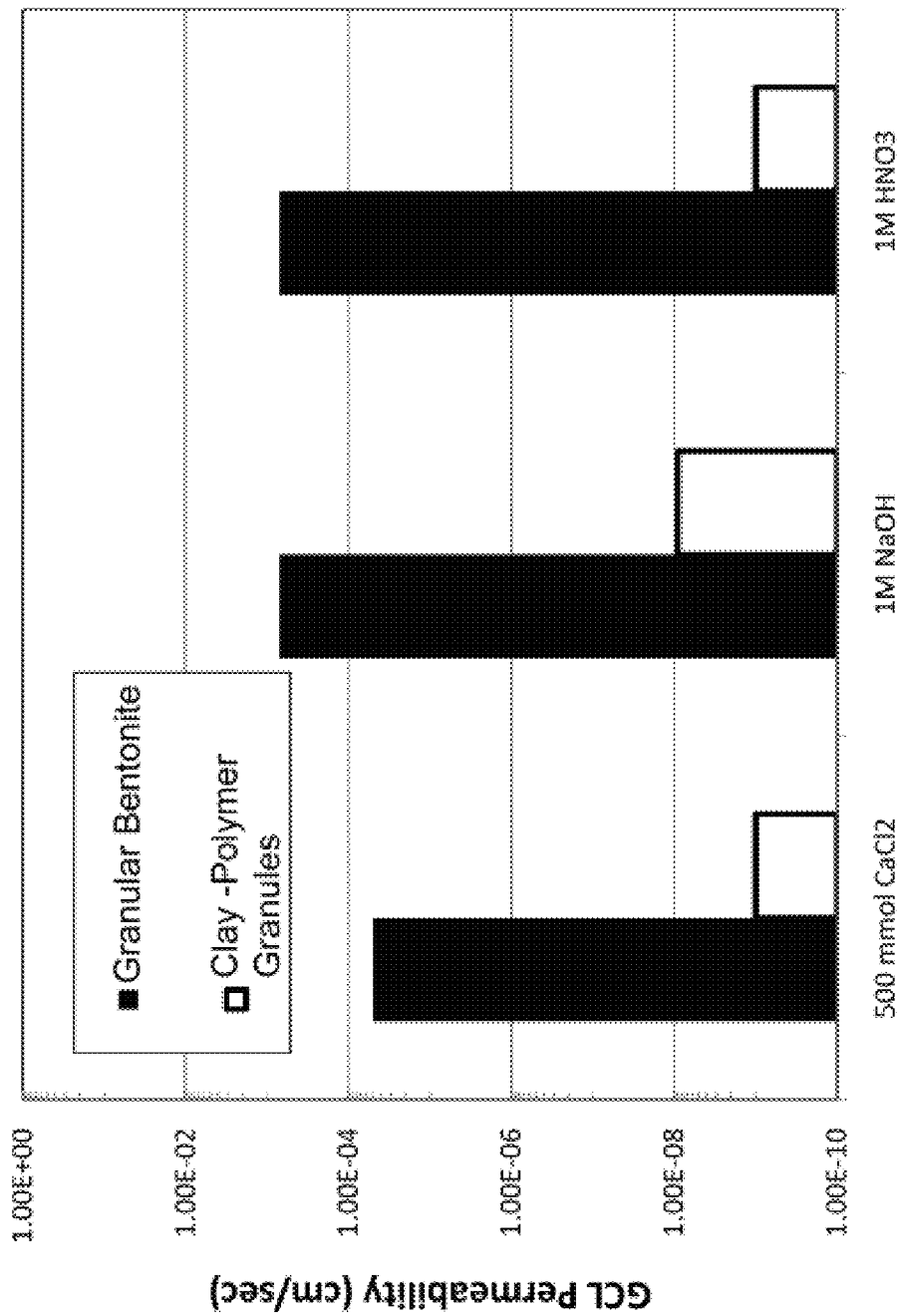
FIG. 4B is a graph illustrating the permeability for clay-polymer granules in accordance with an embodiment of the disclosure and conventional granular bentonite in 500 mmol $CaCl_2$, 1M NaOH, 1M $HNO_3$.

As shown in FIG. 4A, the clay-polymer granules exposed to both high pH (1M NaOH) and low pH (1M HNO$_3$) solutions performed well, exhibiting hydraulic conductivities of 8×10$^{-9}$ cm/sec and 1×10$^{-9}$ cm/sec, respectively. The sample tested including 100% of the clay-polymer granules formed in accordance with Example 1, CPC-1. FIG. 4B further demonstrates that, as compared to bentonite clay alone, the clay-polymer granules demonstrated low hydraulic conductivity in 500 mmol CaCl$_2$ and 1M HNO$_3$.

The clay-polymer granules were subjected to these aggressive conditions for approximately two years, and demonstrated acceptably low permeability over the course of testing.

The foregoing example demonstrates that the clay-polymer granules in accordance with embodiments of the disclosure advantageously demonstrate low permeability in aggressive environments such as high calcium chloride concentrations and both high and low pH solutions. The clay-polymer granules demonstrated significant improvement over bentonite in such environments.

Example 2

Large-Scale Formation of Clay-Polymer Granules

Clay-polymer granules in accordance with embodiments of the disclosure were synthesized in a large-scale, belt feed oven used for hydraulic barrier production. The slurries for forming the clay-polymer granules were formed by weighing the acrylic acid (polymerizable monomer) in polypropylene cup, measuring methylene bisacrylamide (cross-linking agent) in a separate vessel and adding it to the acrylic acid and mixing by swirling to form an acrylic acid solution. The water was measured in a separate plastic container and added to the acrylic acid solution. Sodium hydroxide was measured in a separate vessel and added very slowly to the acrylic acid solution to avoid overheating. The sodium persulfate and the clay were added as the final step along with the initiator solution. The mixture was then blended using a multimixer. The resulting slurry was emptied onto a Teflon cookie sheet and heated in an oven having three heating zones and a final cooling zone. The cooling zone was at a temperature of about 200° F. The resulting, clay-polymer cake was then granulated to form the clay-polymer granules.

A first series of clay-polymer granules were produced at an average oven temperature of about 275° F. The oven had three zones, with the first and second zones being set to about 250° F. and the third zone being set to about 300° F. The compositions and processing parameters for the samples produced in the first series are shown in Table 3, below.

TABLE 3

Clay-Polymer Granules Produced Using an Average Oven Temperature of about 275° F.

| Run Number | Acrylic Acid, 99% (wt %) | MBA (wt %) | Clay (wt %) | 30% Sodium Persulfate (wt %) | 50% NaOH (wt %) | Water (wt %) | Belt Speed (ft/min) |
|---|---|---|---|---|---|---|---|
| 1 | 15.3 | 0.0338 | 50.0 | 1.12 | 13.5 | 20.1 | 10 |
| 2 | 15.8 | 0.0330 | 50.6 | 0.27 | 14.0 | 19.2 | 10 |
| 3 | 15.8 | 0.0330 | 50.6 | 0.27 | 14.0 | 19.2 | 10 |
| 4 | 23.3 | 0.0305 | 39.9 | 0.85 | 20.7 | 15.3 | 10 |
| 5 | 43.3 | 0.0293 | 13.2 | 0.97 | 38.5 | 4.0 | 10 |
| 6 | 30.8 | 0.0239 | 30.8 | 0.25 | 27.4 | 10.6 | 10 |
| 7 | 44.1 | 0.0224 | 13.0 | 0.48 | 39.2 | 3.3 | 10 |
| 8 | 30.6 | 0.0309 | 30.6 | 0.60 | 27.2 | 11.0 | 10 |
| 9 | 43.9 | 0.0286 | 13.7 | 0.24 | 38.9 | 3.2 | 10 |
| 10 | 15.3 | 0.0301 | 50.0 | 1.12 | 13.5 | 20.1 | 10 |
| 11 | 15.1 | 0.0260 | 51.2 | 0.56 | 13.4 | 19.8 | 10 |
| 12 | 30.3 | 0.0245 | 30.3 | 1.04 | 26.9 | 11.5 | 10 |
| 13 | 15.1 | 0.0260 | 51.2 | 0.56 | 13.4 | 19.8 | 20 |
| 14 | 43.3 | 0.0293 | 13.2 | 0.97 | 38.5 | 4.0 | 20 |
| 15 | 30.8 | 0.0239 | 30.8 | 0.25 | 27.4 | 10.6 | 20 |
| 16 | 44.1 | 0.0224 | 13.0 | 0.48 | 39.2 | 3.3 | 20 |
| 17 | 43.9 | 0.0286 | 13.7 | 0.24 | 38.9 | 3.2 | 20 |
| 18 | 30.6 | 0.0309 | 30.6 | 0.60 | 27.2 | 11.0 | 20 |
| 19 | 43.9 | 0.0286 | 13.7 | 0.24 | 38.9 | 3.2 | 20 |
| 20 | 15.3 | 0.0338 | 50.0 | 1.12 | 13.5 | 20.1 | 20 |
| 21 | 30.3 | 0.0245 | 30.3 | 1.04 | 26.9 | 11.5 | 20 |
| 22 | 15.8 | 0.0330 | 50.6 | 0.27 | 14.0 | 19.2 | 20 |
| 23 | 43.3 | 0.0260 | 13.2 | 0.97 | 38.5 | 4.0 | 20 |
| 24 | 23.3 | 0.0305 | 39.9 | 0.85 | 20.7 | 15.3 | 20 |

A second series of clay-polymer granules were produced at an average oven temperature of about 375° F. The oven had three heating zones, with the first and second zone being set to about 350° F. and the third zone being set to about 400° F. The compositions and processing conditions for the samples produced in the second series are shown in Table 4, below.

TABLE 4

Clay-Polymer Granules Produced Using an Average Oven Temperature of about 375° F.

| Run Number | Acrylic Acid, 99% (wt %) | MBA (wt %) | Clay (wt %) | 30% Sodium Persulfate (wt %) | 50% NaOH (wt %) | Water (wt %) | Belt Speed (ft/min) |
|---|---|---|---|---|---|---|---|
| 25 | 30.6 | 0.031 | 30.6 | 0.60 | 27.2 | 11.0 | 10 |
| 26 | 30.3 | 0.025 | 30.3 | 1.04 | 26.9 | 11.5 | 10 |
| 27 | 15.3 | 0.034 | 50.0 | 1.12 | 13.5 | 20.1 | 10 |
| 28 | 44.1 | 0.022 | 13.0 | 0.48 | 39.2 | 3.3 | 10 |
| 29 | 37.1 | 0.028 | 21.7 | 0.79 | 33.0 | 7.4 | 10 |
| 30 | 43.9 | 0.029 | 13.7 | 0.24 | 38.9 | 3.2 | 10 |
| 31 | 43.3 | 0.029 | 13.2 | 0.97 | 38.5 | 4.0 | 10 |
| 32 | 15.3 | 0.030 | 50.0 | 1.12 | 13.5 | 20.1 | 10 |
| 33 | 23.3 | 0.031 | 39.9 | 0.85 | 20.7 | 15.3 | 10 |
| 34 | 30.8 | 0.024 | 30.8 | 0.25 | 27.4 | 10.6 | 10 |
| 35 | 15.1 | 0.026 | 51.2 | 0.56 | 13.4 | 19.8 | 10 |
| 36 | 15.8 | 0.033 | 50.6 | 0.27 | 14.0 | 19.2 | 10 |
| 37 | 44.1 | 0.022 | 13.0 | 0.48 | 39.2 | 3.3 | 20 |
| 38 | 15.8 | 0.033 | 50.6 | 0.27 | 14.0 | 19.2 | 20 |
| 39 | 37.4 | 0.027 | 21.6 | 0.66 | 33.2 | 7.2 | 20 |
| 40 | 30.6 | 0.031 | 30.6 | 0.60 | 27.2 | 11.0 | 20 |
| 41 | 43.9 | 0.029 | 13.7 | 0.24 | 38.9 | 3.2 | 20 |
| 42 | 30.3 | 0.025 | 30.3 | 1.04 | 26.9 | 11.5 | 20 |
| 43 | 15.1 | 0.026 | 51.2 | 0.56 | 13.4 | 19.8 | 20 |
| 44 | 30.3 | 0.025 | 30.3 | 1.04 | 26.9 | 11.5 | 20 |
| 45 | 15.8 | 0.033 | 50.6 | 0.27 | 14.0 | 19.2 | 20 |
| 46 | 30.8 | 0.024 | 30.8 | 0.25 | 27.4 | 10.6 | 20 |
| 47 | 43.3 | 0.029 | 13.2 | 0.97 | 38.5 | 4.0 | 20 |
| 48 | 15.3 | 0.034 | 50.0 | 1.12 | 13.5 | 20.1 | 20 |
| 49 | 23.3 | 0.031 | 39.9 | 0.85 | 20.7 | 15.3 | 20 |
| 50 | 30.8 | 0.024 | 30.8 | 0.25 | 27.4 | 10.6 | 20 |

Example 3

Polymer Activation Testing

The molecular weight distribution and the ability of the clay-polymer granules formed under different conditions were tested. The results demonstrate that the performance of the clay-polymer granules can be tailored by altering the formation conditions. The inventors have advantageously and surprisingly discovered that the amount of cross-linking agent and the temperature of polymerization have significant effects on the performance of the clay-polymer granules. It was surprisingly found that the relative amount of clay to monomer ratio impacts the activity of the final product. Surprisingly, higher clay contents favor higher activity at a given polymerization conditions. It was also surprisingly found that the amount of clay also affects the speed at which the polymer can activate and, thus, the overall performance of the clay-polymer granules. The clay would not have been expected to promote activation of the polymer in the formulation, affecting the speed at which a portion of the polymer solubilizes when contact with water. Without intending to be bound by theory, it is believed that the clay performs as a physical dispersing agent during polymerization of the organic monomer, thereby resulting in polymer chains having linear or lightly branched structures, which can have enhanced water solubility depending on the molecular weight.

To demonstrate the performance advantage of the clay/polymer composite in rapidly allowing the polymer to dissolve and become available in the hydraulic barrier, various clay-polymer formulations were tested by adding 20 grams of the clay-polymer granules to a polyester pouch with dimensions of 4 in. wide by 4 in long. The polyester pouch had a fabric weight of 0.035 lb/sq. ft. The clay-polymer granules were completely sealed inside the polyester pouch using a heat sealer or adhesive. The pouches were completely submerged in 700 mL of deionized water. Air was allowed to escape the filled pouch and a lid or cover was placed onto the container to prevent water evaporation. The container was maintained at 72° F. (about 22° C.) and remained out of direct contact with sunlight. At set time intervals, the container lid was removed and a 2 mL sample of the water surrounding the filled pouch (i.e., the effluent) was taken using a pipette. The absorbance of the water sample was measured by UV-Vis at 195 nm. The sampled water was replaced back into the container to maintain constant water volume of 700 mL for further sampling.

The measured absorbance value can be used to calculate the concentration of oligomer using the equation below. The concentration of oligomer in the sampled effluent is indicative of the performance and the extent of immediate response that would be exhibited by a hydraulic barrier containing the clay-polymer granules.

$$[AM]=(ABS-0.5)/0.0031$$  Equation 1.

wherein, AM is the concentration of active material (ppm), and ABS is the absorbance value of the water sample at 195 nm. The processing conditions for forming the clay-polymer granules along with the measured absorbance are shown in Table 5, below.

TABLE 5

Release Amounts of the Clay-Polymer Composite After Leaching in Deionized Water for Four Hours

| Example | Acrylic Acid, (%) | MBA (%) | NT Clay (%) | 30% Sodium Persulfate (%) | 50% NaOH (%) | DI Water (%) | Line Speed (ft/min) | Oven Zone Temp (° F.) | 4 hr Active Material Release cone (ppm) |
|---|---|---|---|---|---|---|---|---|---|
| CPC-3 | 43.9% | 0.029% | 13.7% | 0.24% | 38.9% | 3.2% | 10 | 350/350/400 | 623.5 |
| CPC-4 | 43.9% | 0.029% | 13.7% | 0.24% | 38.9% | 3.2% | 10 | 250/250/300 | 588.7 |
| CPC-5 | 30.8% | 0.024% | 30.8% | 0.25% | 27.4% | 10.6% | 10 | 350/350/400 | 587.1 |
| CPC-6 | 30.8% | 0.024% | 30.8% | 0.25% | 27.4% | 10.6% | 20 | 250/250/300 | 584.8 |
| CPC-7 | 30.3% | 0.024% | 30.3% | 1.04% | 26.9% | 11.5% | 10 | 250/250/300 | 576.5 |
| CPC-8 | 15.8% | 0.033% | 50.6% | 0.27% | 14.0% | 19.2% | 10 | 250/250/300 | 571.6 |
| CPC-9 | 44.1% | 0.022% | 13.0% | 0.48% | 39.2% | 3.3% | 10 | 350/350/400 | 555.8 |
| CPC-10 | 43.9% | 0.029% | 13.7% | 0.24% | 38.9% | 3.2% | 20 | 250/250/300 | 503.5 |
| CPC-11 | 30.8% | 0.024% | 30.8% | 0.25% | 27.4% | 10.6% | 10 | 250/250/300 | 501.0 |
| CPC-12 | 37.1% | 0.028% | 21.7% | 0.79% | 33.0% | 7.4% | 10 | 350/350/400 | 496.5 |
| CPC-13 | 43.3% | 0.029% | 13.2% | 0.97% | 38.5% | 4.0% | 10 | 350/350/400 | 452.6 |
| CPC-14 | 15.1% | 0.026% | 51.2% | 0.56% | 13.4% | 19.8% | 10 | 350/350/400 | 432.6 |
| CPC-15 | 15.8% | 0.033% | 50.6% | 0.27% | 14.0% | 19.2% | 10 | 350/350/400 | 401.6 |
| CPC-16 | 23.3% | 0.031% | 39.9% | 0.85% | 20.7% | 15.3% | 10 | 350/350/400 | 361.9 |
| CPC-17 | 30.8% | 0.024% | 30.8% | 0.25% | 27.4% | 10.6% | 20 | 350/350/400 | 361.6 |
| CPC-18 | 30.6% | 0.031% | 30.6% | 0.60% | 27.2% | 11.0% | 10 | 350/350/400 | 316.1 |
| CPC-19 | 30.3% | 0.024% | 30.3% | 1.04% | 26.9% | 11.5% | 10 | 350/350/400 | 297.1 |
| CPC-20 | 15.8% | 0.033% | 50.6% | 0.27% | 14.0% | 19.2% | 20 | 350/350/400 | 266.8 |
| CPC-21 | 43.9% | 0.029% | 13.7% | 0.24% | 38.9% | 3.2% | 20 | 250/250/300 | 218.4 |
| CPC-22 | 15.1% | 0.026% | 51.2% | 0.56% | 13.4% | 19.8% | 10 | 250/250/300 | 200.0 |
| CPC-23 | 44.1% | 0.022% | 13.0% | 0.48% | 39.2% | 3.3% | 20 | 250/250/300 | 198.4 |
| CPC-24 | 43.3% | 0.029% | 13.2% | 0.97% | 38.5% | 4.0% | 20 | 350/350/400 | 191.9 |
| CPC-25 | 43.3% | 0.026% | 13.2% | 0.97% | 38.5% | 4.0% | 20 | 250/250/300 | 157.4 |
| CPC-26 | 44.1% | 0.022% | 13.0% | 0.48% | 39.2% | 3.3% | 20 | 350/350/400 | 151.0 |
| CPC-27 | 30.6% | 0.031% | 30.6% | 0.60% | 27.2% | 11.0% | 10 | 250/250/300 | 138.4 |
| CPC-28 | 30.6% | 0.031% | 30.6% | 0.60% | 27.2% | 11.0% | 20 | 350/350/400 | 86.1 |
| CPC-29 | 15.1% | 0.026% | 51.2% | 0.56% | 13.4% | 19.8% | 20 | 250/250/300 | 37.4 |
| CPC-30 | 15.3% | 0.034% | 50.0% | 1.12% | 13.5% | 20.1% | 10 | 350/350/400 | 32.9 |
| CPC-31 | 15.8% | 0.033% | 50.6% | 0.27% | 14.0% | 19.2% | 20 | 250/250/300 | 31.9 |
| CPC-32 | 15.3% | 0.034% | 50.0% | 1.12% | 13.5% | 20.1% | 10 | 250/250/300 | 20.0 |
| CPC-33 | 15.3% | 0.030% | 50.0% | 1.12% | 13.5% | 20.1% | 10 | 350/350/400 | 11.3 |
| CPC-34 | 30.3% | 0.024% | 30.3% | 1.04% | 26.9% | 11.5% | 20 | 250/250/300 | 7.7 |
| CPC-35 | 23.3% | 0.031% | 39.9% | 0.85% | 20.7% | 15.3% | 10 | 250/250/300 | 0.0 |
| CPC-36 | 30.6% | 0.031% | 30.6% | 0.60% | 27.2% | 11.0% | 20 | 250/250/300 | 0.0 |
| CPC-37 | 15.3% | 0.034% | 50.0% | 1.12% | 13.5% | 20.1% | 20 | 250/250/300 | 0.0 |
| CPC-38 | 23.3% | 0.031% | 39.9% | 0.85% | 20.7% | 15.3% | 20 | 250/250/300 | 0.0 |
| CPC-39 | 30.3% | 0.024% | 30.3% | 1.04% | 26.9% | 11.5% | 20 | 350/350/400 | 0.0 |
| CPC-40 | 30.3% | 0.024% | 30.3% | 1.04% | 26.9% | 11.5% | 20 | 350/350/400 | 0.0 |

Samples CPC-1 to CPC-27 demonstrated acceptable levels of polymer release capability to be characterized as a fast activating clay-polymer granule. A concentration of 100 PPM after 4 hours in deionized water is acceptable and a concentration of >500 PPM after 4 hours is preferred.

As illustrated in FIGS. 7-10, a subsequent test was performed in which select CPC formulations were tested in aggressive leachates. These leaching tests were similar to the prior tests except that the total polymer content in the system was fixed at 7 grams regardless of the formulation of the CPC granule. In this way, the CPC samples could be compared to a low molecular weight polymer control. Three leaching solutions were prepared where a high pH, a low pH and a 500 mmol.

Based on these tests it was determined that the amount of cross-linking agent and the temperature during polymerization had the most significant affect on the performance of the clay-polymer granules. In particular, it was determined that the clay-polymer granules would most quickly activate with lower polymerization temperatures and lower amounts of cross-linking agent. The temperature needs to be sufficiently high, however, to allow for polymerization of the monomer. Surprisingly, it was determined that increase the clay content also promoted higher release rates of active material at a given monomer composition. Table 6 below provides a theoretically determined set of ranges for the composition and processing conditions, which is believed to produce clay-polymer granules having high polymer activity in the elution test.

TABLE 6

Theoretically Determined Optimized Composition and Processing Conditions

| Material/Processing Condition | Function | Range |
|---|---|---|
| Acrylic Acid, 99% | Organic monomer | 22.11-75.13 wt % |
| N'N' Methylene-bisacrylamide, 99% (MBA) | Cross-linking agent | 0.0382-0.0489 wt % |
| Sodium Bentonite Clay | Clay | 22.11-75.13 wt % |
| 30% Sodium Persulfate, 98+% | Initiator | 1.35-5.42 wt % |
| Belt Speed | — | 10-20 ft/min |

TABLE 6-continued

Theoretically Determined Optimized Composition and Processing Conditions

| Material/Processing Condition | Function | Range |
|---|---|---|
| Oven Temperature | — | 275-375° F. |
| Granule Size | — | 6-320 mesh |

Based on these relationships, the compositions and processing conditions in forming the clay-polymer granules were particularly selected to achieve high activity during the elution test. Table 7 below provides the composition and processing conditions of these clay-polymer granules.

TABLE 7

Clay-Polymer Granules Produced to Gauge Activity During the Elution Test

| Sample No. | Acrylic Acid, 99% (wt %) | MBA (wt %) | Clay (wt %) | Sodium Persulfate (wt %) | Belt Speed (ft/min) | Oven Temp (° F.) | Predicted 4 hour Active Material Release (ppm) |
|---|---|---|---|---|---|---|---|
| 51 | 74.76 | 0.04 | 23.63 | 1.56 | 10 | 375 | 630 |
| 52 | 73.63 | 0.05 | 24.71 | 1.61 | 10 | 375 | 634 |
| 53 | 72.59 | 0.05 | 25.93 | 1.44 | 10 | 375 | 633 |
| 54 | 75.01 | 0.04 | 23.53 | 1.42 | 20 | 375 | 642 |
| 55 | 73.66 | 0.04 | 24.90 | 1.40 | 20 | 375 | 629 |
| 56 | 70.81 | 0.05 | 27.79 | 1.36 | 20 | 375 | 629 |
| 57 | 71.92 | 0.04 | 26.68 | 1.36 | 20 | 375 | 629 |
| 58 | 73.87 | 0.04 | 24.65 | 1.44 | 10 | 275 | 625 |
| 59 | 74.89 | 0.04 | 23.59 | 1.48 | 10 | 275 | 628 |
| 60 | 74.86 | 0.04 | 23.74 | 1.36 | 20 | 275 | 624 |
| 61 | 67.58 | 0.04 | 31.03 | 1.35 | 10 | 275 | 577 |
| 62 | 64.56 | 0.04 | 34.06 | 1.35 | 20 | 375 | 552 |
| 63 | 58.15 | 0.04 | 40.46 | 1.35 | 10 | 375 | 501 |
| 64 | 50.68 | 0.04 | 47.93 | 1.35 | 10 | 275 | 445 |
| 65 | 49.48 | 0.04 | 49.13 | 1.35 | 20 | 275 | 430 |
| 66 | 47.29 | 0.04 | 51.32 | 1.35 | 10 | 375 | 421 |
| 67 | 41.7 | 0.04 | 56.92 | 1.35 | 20 | 375 | 382 |

A regression analysis of the variables associated with the polymerization conditions and formula with the release response allowed for the development of a predictive transfer function. This transfer function allowed the inventors to calculate the predicted 4-hr Active Material release values which are listed in Table 6.

Example 4

Molecular Weight Testing

The molecular weight distribution of the clay-polymer granules in accordance with embodiments of the disclosure was analyzed. This analysis confirms that upon contact with water, a portion of the polymer having a low molecular weight dissolves or disperses in water and travels through the clay, temporarily clogging the clay pores and platelets to provide an immediate impermeability. The low molecular weight polymer chains eventually pass through the clay, but allow sufficient time for high molecular weight polymer chains to dissolve or disperse in water and become entrapped (more permanently) in the clay platelets and pores to provide a more permanent and long-lasting impermeability.

Figure 5B:
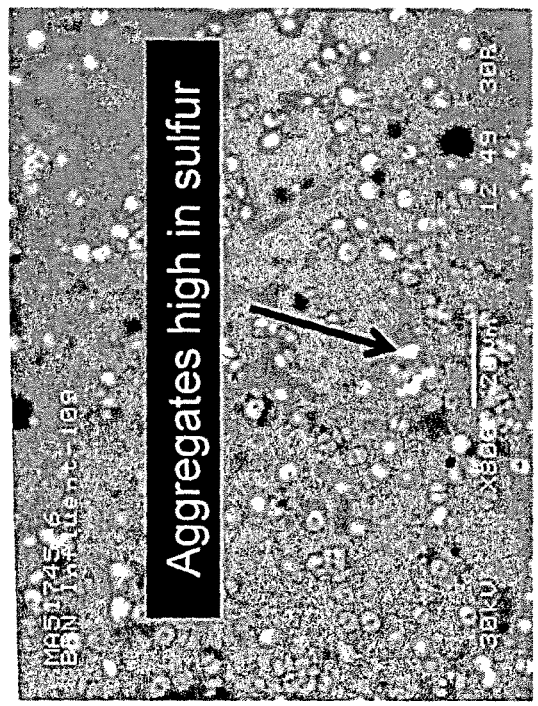
FIG. 5B is a scanning electron micrograph of the polymer effluent from the permeability experiments analyzed in FIG. 5A.
Figure 5A:
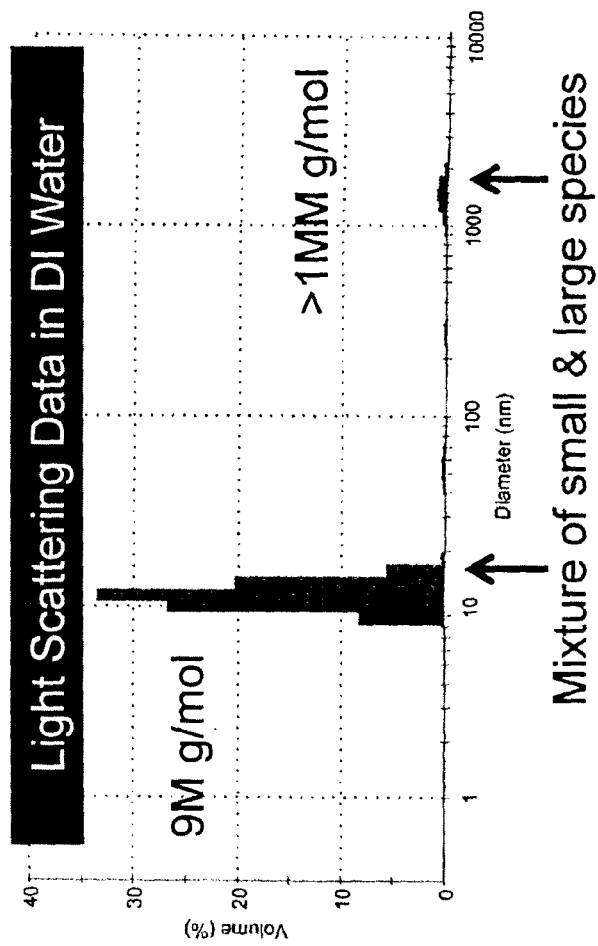
FIG. 5A is a light scattering plot illustrating the polymer molecular weight distribution of an effluent collected after contacting a hydraulic barrier composition in accordance with an embodiment of the disclosure with water.

The CPC-1 granules were subjected to a permeability test in deionized water according to ASTM D 5084 with an average effective stress of 20 kPa and a hydraulic gradient of 200. The outlet water was collected in a bladder accumulator and dried for light scattering analysis using a Malvern Nano-ZS zetasizer. The molecular weight distribution, shown in FIG. 5A shows a bimodal distribution of polymers with a large population of low molecular weight samples and a small population of high molecular weight species. This analysis confirms that upon contact with water, a portion of the polymer having a low molecular weight dissolves or disperses in water and travels through the clay pores and platelets to provide an immediate impermeability. The low molecular weight polymer chains eventually pass through the clay, but allow sufficient time for high molecular weight polymer chains to dissolve or disperse in water and become entrapped (more permanently) in the clay platelets and pores to provide a more permanent and long-lasting impermeability. Further analysis of the dried polymer sample from the outlet accumulator shows the presence of a small amount of aluminosilicate clay that is rich in sulfur. This data indicates that there may be some chemical bonds formed between the polymer and the clay to further aid in the process of blocking the pores in between the clay granules.

Figure 6A:
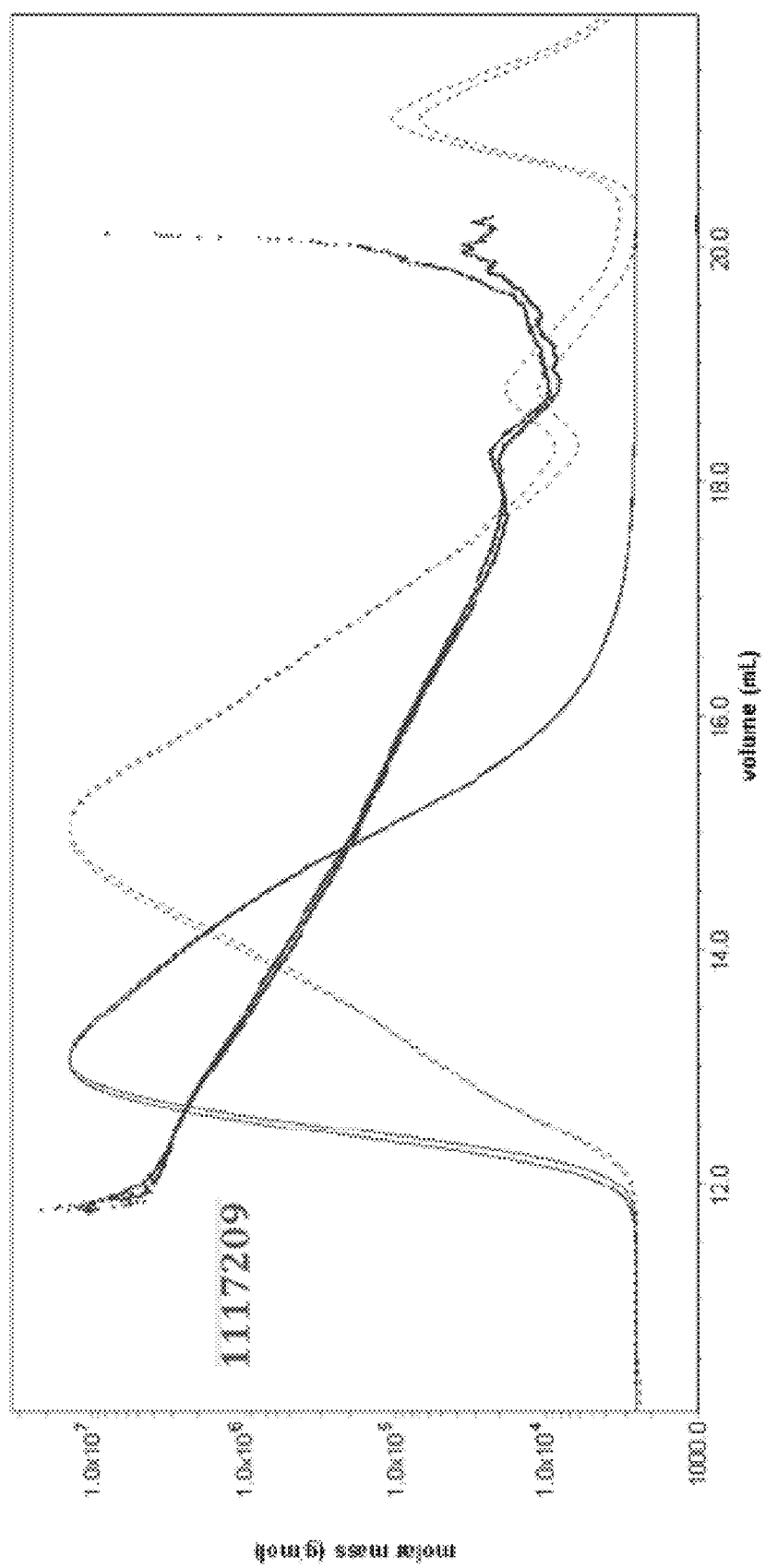
FIG. 6A are GPC refractive index and right-angle light scattering chromatograms and the log(molecular weight) vs. retention volume plot (calculated using light scattering analysis) of the influent in contact with a hydraulic barrier composition in accordance with an embodiment of the disclosure.
Figure 6B:
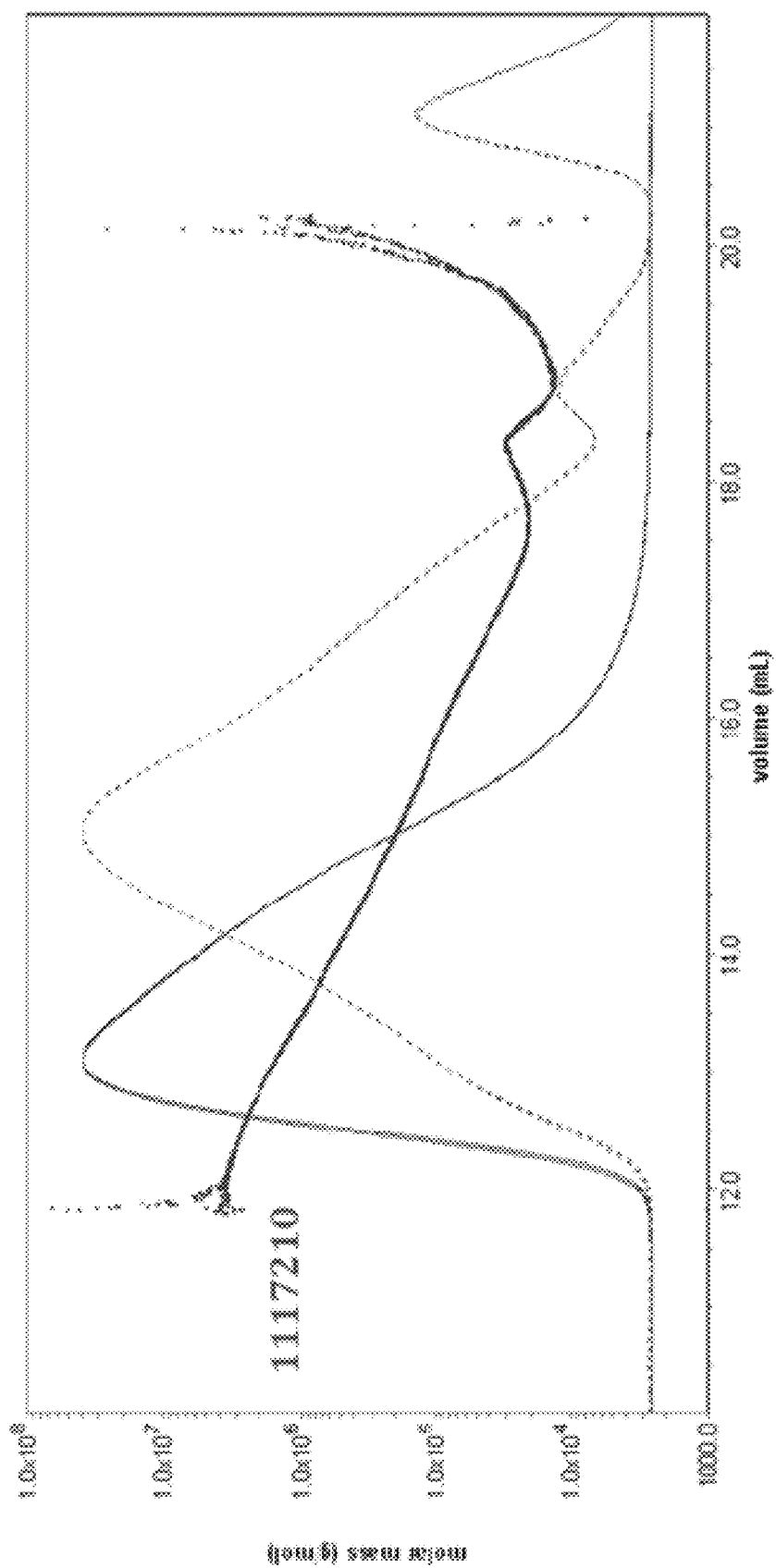
FIG. 6B is GPC refractive index and right-angle light scattering chromatograms and the log(molecular weight) vs. retention volume plot (calculated using light scattering analysis) of the effluent after passing through a hydraulic barrier composition in accordance with an embodiment of the disclosure.

Further molecular weight testing of the CPC-1 sample by size exclusion chromatography was performed on the polymer solutions isolated on both the inlet side and the outlet sides of the permeability experiment. Results of the analysis are shown in Table 8, below, and in FIGS. 6A and 6B. The data shown in FIGS. 6A (inlet side) and 6B (outlet side) show that the molecular weight distribution changes as the polymers pass through the hydraulic barrier. The analysis of the chromatograms detailed in Table 8 shows that the polydispersity index decreases from 6 to 4 as the polymers pass through the hydraulic barrier. Comparison of the size exclusion chromatography traces shows that the polymer collected on the outlet side of the experiment contained less low molecular weight and high molecular weight species.

TABLE 8

Molecular Weight Change from Influent to Effluent

| Sample Number | Injection No. | Molecular Weight Averages (g/mol) | | | |
|---|---|---|---|---|---|
| | | $M_n$ | $M_w$ | $M_z$ | $M_w/M_n$ |
| Influent (1117209) | 1 | 53,980 | 280,100 | 954,700 | 5.19 |
| | 2 | 47,400 | 282,300 | 924,300 | 5.96 |
| | Average | 50,690 | 281,200 | 939,500 | 5.57 |
| | Std. Dev. | 4,653 | 1,556 | 21,496 | 0.54 |
| Effluent (1117210) | 1 | 61,820 | 294,200 | 920,00 | 4.76 |
| | 2 | 61,730 | 293,600 | 917,400 | 4.76 |
| | Average | 61,775 | 293,900 | 918,700 | 4.76 |
| | Std. Dev. | 64 | 424 | 1838 | 0 |

The results demonstrate that the molecular weight of the effluent polymer is attenuated, which indicates that lower-molecular weight polymer chains are activating quickly upon contact with water. These polymers are smaller and more mobile, which may allow them to interact with more areas of the clay galleries and increase their likelihood of interacting with binding sites on the clay. From the size exclusion chromatography data, it is believed that polymer chains having a molecular weight less than $6 \times 10^4$ g/mol (i.e., "low molecular weight polymer chains") are strongly interactive. Very high molecular weight polymers would be expected to be slower to hydrate and also move more slowly through the clay pores due to their coil dimensions in solution. Polymer chains having molecular weights greater than $9 \times 10^5$ g/mol (i.e., "very large molecular weight polymer chains") were less likely to elude from the clay barrier. The "medium sized chains" are more mobile and can elude more easily.

Example 5

Polymer Activation Testing in Aggressive Leachate

The elution test described in Example 3 above was used to evaluate the polymer activation of the clay-polymer granules in an aggressive environment. A commercially available, low molecular weight polymer (250,000 MW NAPAA) was used as a control. The commercial polymer had a similar molecular weight to what was experimentally determined as the molecular weight of the polymer chains eluted from the clay-polymer granules during the activity test. Three clay-polymer granule samples were also analyzed. The compositions of the three clay-polymer granule samples are provided in Table 9, below. The samples B and C were prepared using a zoned, production line oven having an average temperature of 375° F., with the first and second zones being set to 350° F. and the third zone being set to 400° F. Sample A was produced using a lab-sized oven, and prepared as described in Example 1. Samples B and C were prepared as described in Example 2. The composition and processing conditions for Sample C were optimized as described in Example 3.

TABLE 9

Clay-Polymer Composition

| | Sample A (wt %) | Sample B (wt %) | Sample C (wt %) |
|---|---|---|---|
| Acrylic Acid, 99% | 11.41 wt % | 11.41 wt % | 43.85 wt % |
| MBA | 0.03 wt % | 0.03 wt % | 0.03 wt % |
| Deionized Water | 38.90 wt % | 38.90 wt % | 3.23 wt % |
| Sodium Hydroxide | 9.5 wt % | 9.5 wt % | 38.95 wt % |
| Clay | 38.76 wt % | 38.76 wt % | 13.70 wt % |
| Sodium Persulfate | 1.4 wt % | 1.4 wt % | 0.24 wt % |
| Oven Temp | 375° F. (Lab-oven) | 375° F. (zoned, production line oven) | 375° F. (zoned, production line oven) |

Figure 7:
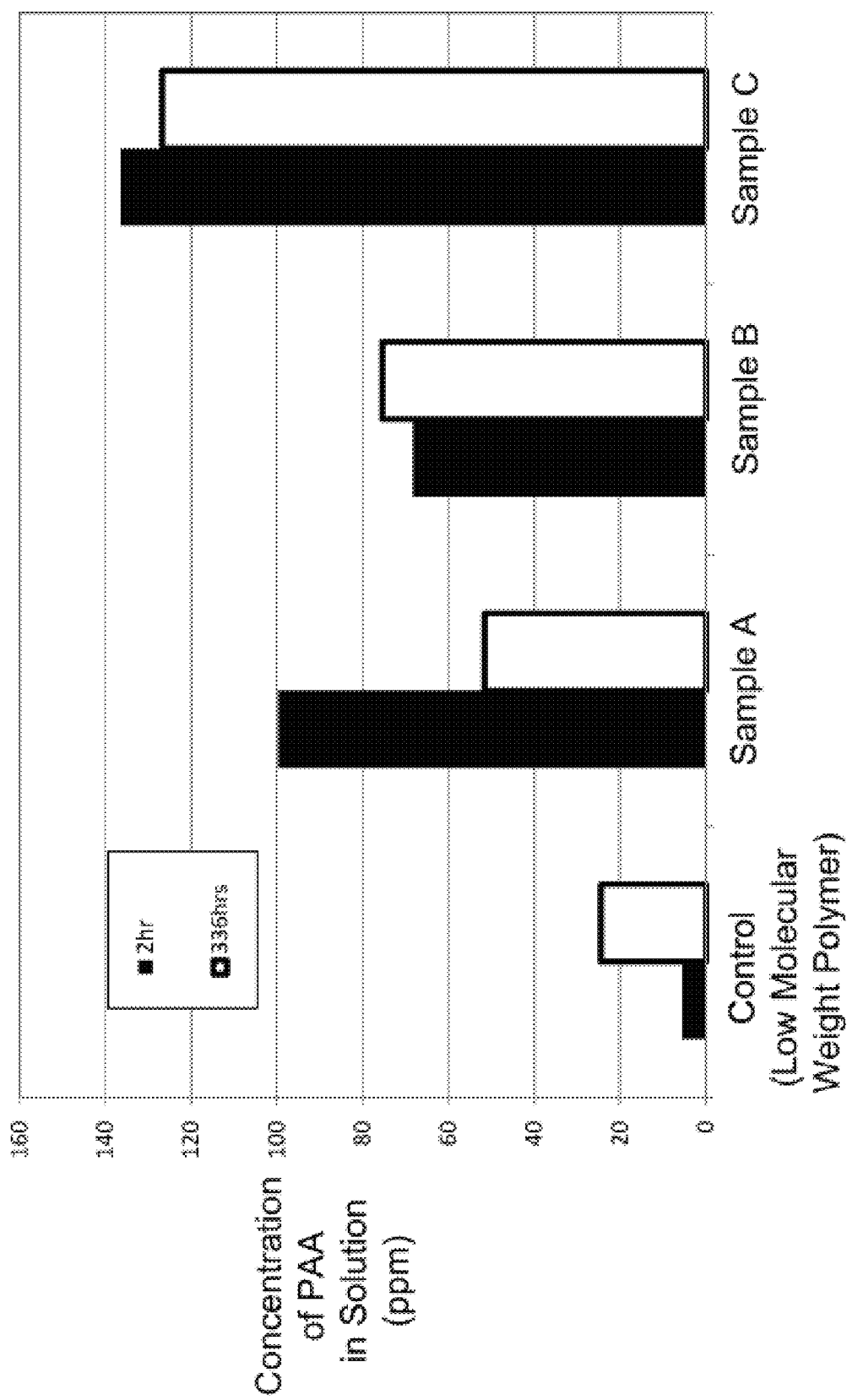
FIG. 7 is a graph illustrating the concentration of polymer released from a control and clay-polymer granules in accordance with embodiments of the disclosure as tested using the elution test in 500 mmol $CaCl_2$.

FIG. 7 illustrates the results of the elution test performed in 500 mmol $CaCl_2$, with concentration samples being taken at 2 hours (black bars) and 336 hours (white bars). As demonstrated in FIG. 7, the control—low molecular weight polymer alone—did not activate quickly when exposed to an aggressive environment. The clay-polymer granules demonstrate significantly increased release of polymer in the short time frame (2 hour measurement) as compared to the control sample. Sample C, demonstrated improved short and long term polymer release as compared to Samples A and B.

Figure 8:
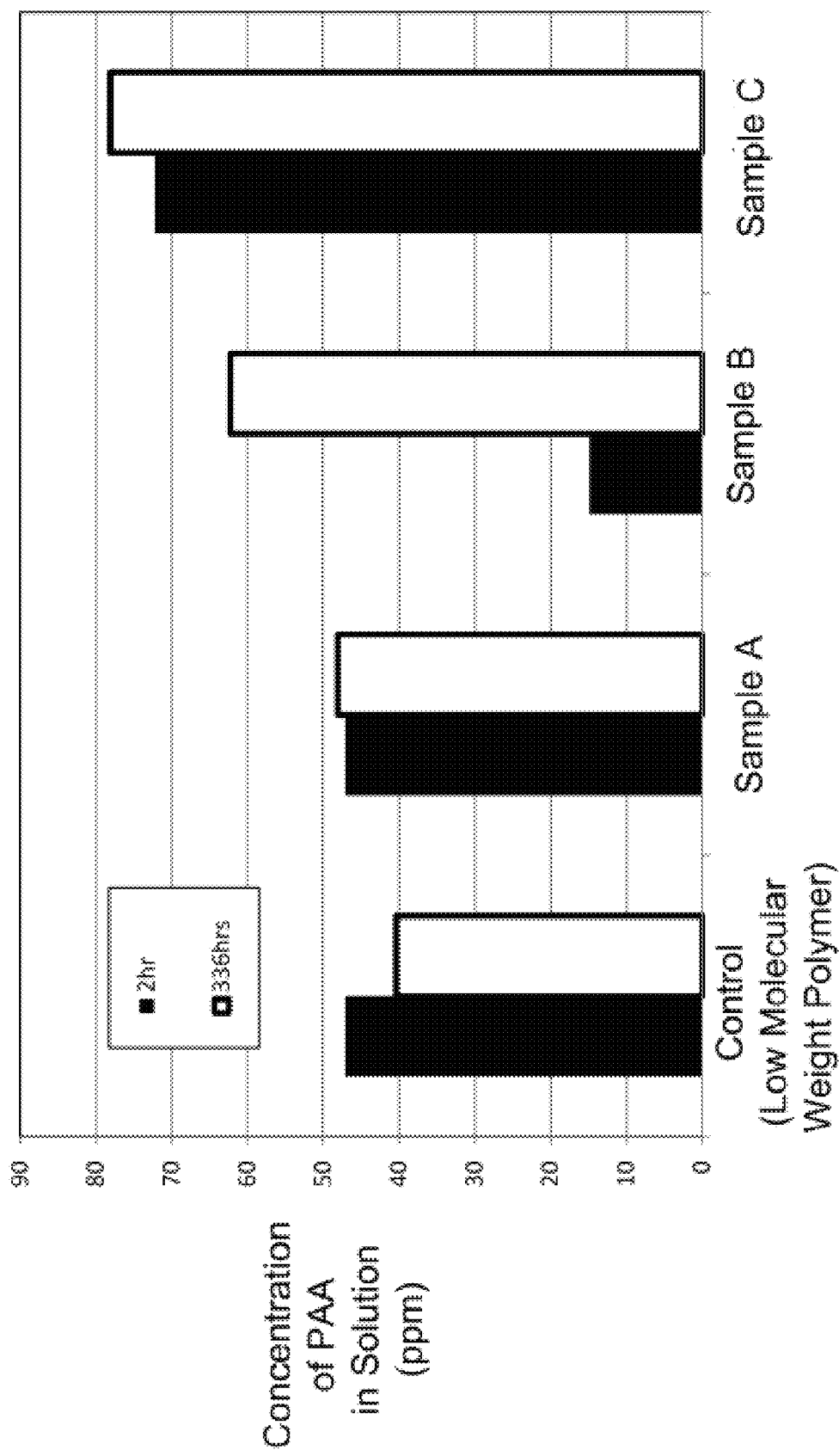
FIG. 8 is a graph illustrating the concentration of polymer released from a control and clay-polymer granules in accordance with embodiments of the disclosure as tested using the elution test in a low pH leachate.

FIG. 8 illustrates the results of the activity test for a low pH (pH=1.5) leachate. Sample C demonstrated significantly improved short and long term elution as compared to the other samples. Sample A demonstrated comparable initial, short term results as the low molecular weight polymer, but improved long term results. Sample B demonstrated improved long term elution results as compared to the control. These results demonstrate that the composition and the processing parameters (optimized in Sample C) can significantly affect the performance of the clay-polymer granules in various aggressive environments.

Figure 9:
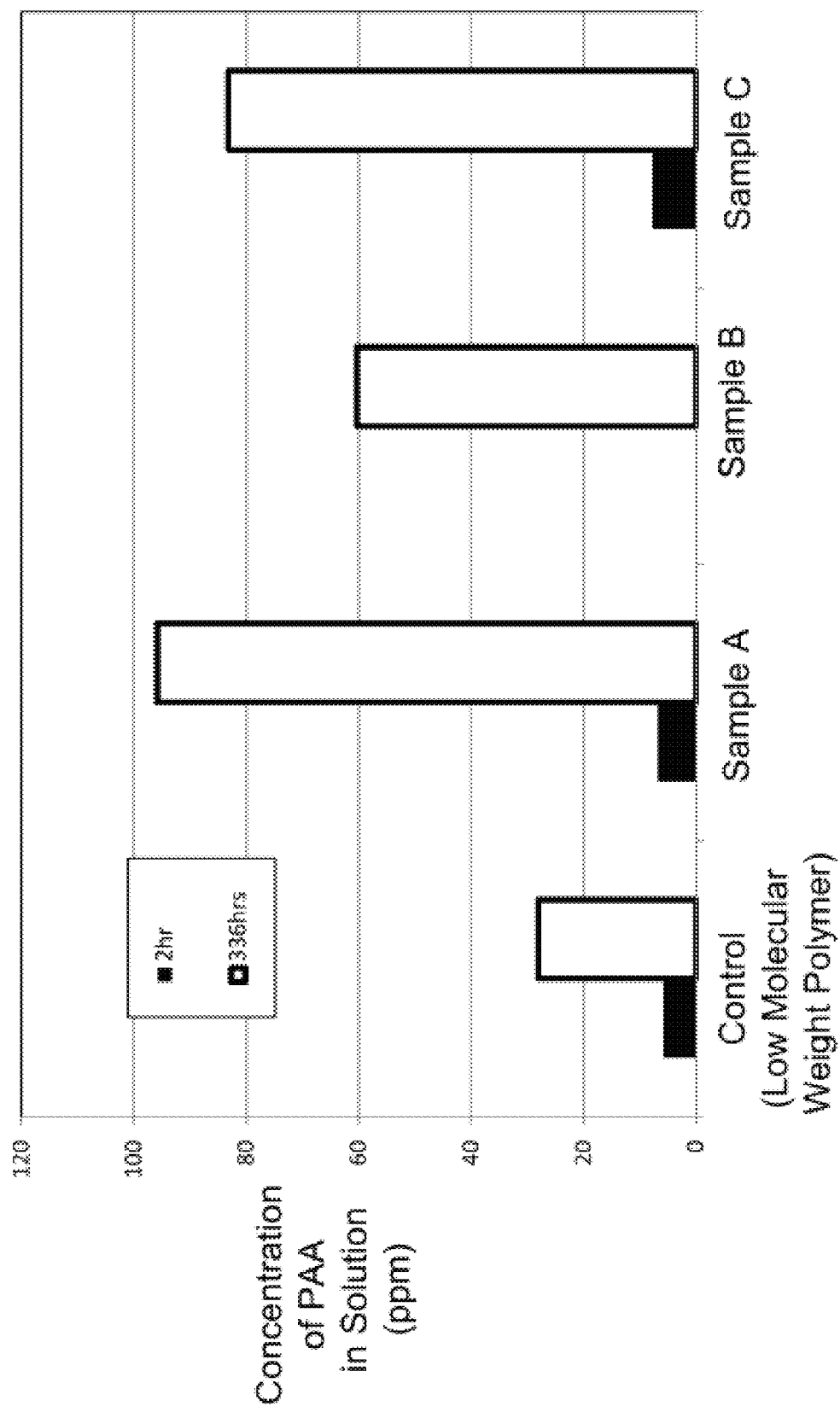
FIG. 9 is a graph illustrating the concentration of polymer released from a control and clay-polymer granules in accordance with embodiments of the disclosure as tested using the elution test in a high pH leachate.

FIG. 9 illustrates the results of the elution test in a high pH (pH=11) leachate. These results demonstrate that the clay-polymer granules in accordance with embodiments of the invention are capable of activating quickly upon contact with an aggressive leachate. These results further demonstrate that providing low-molecular weight polymer alone does not result in a composition that quickly activates. Without intending to be bound by theory, it is believed that the presence of both high and low molecular weight polymers in the clay-polymer granules, as well as the presence of the clay results in the ability of the granules to quickly activate in aggressive environments.

Figure 10:
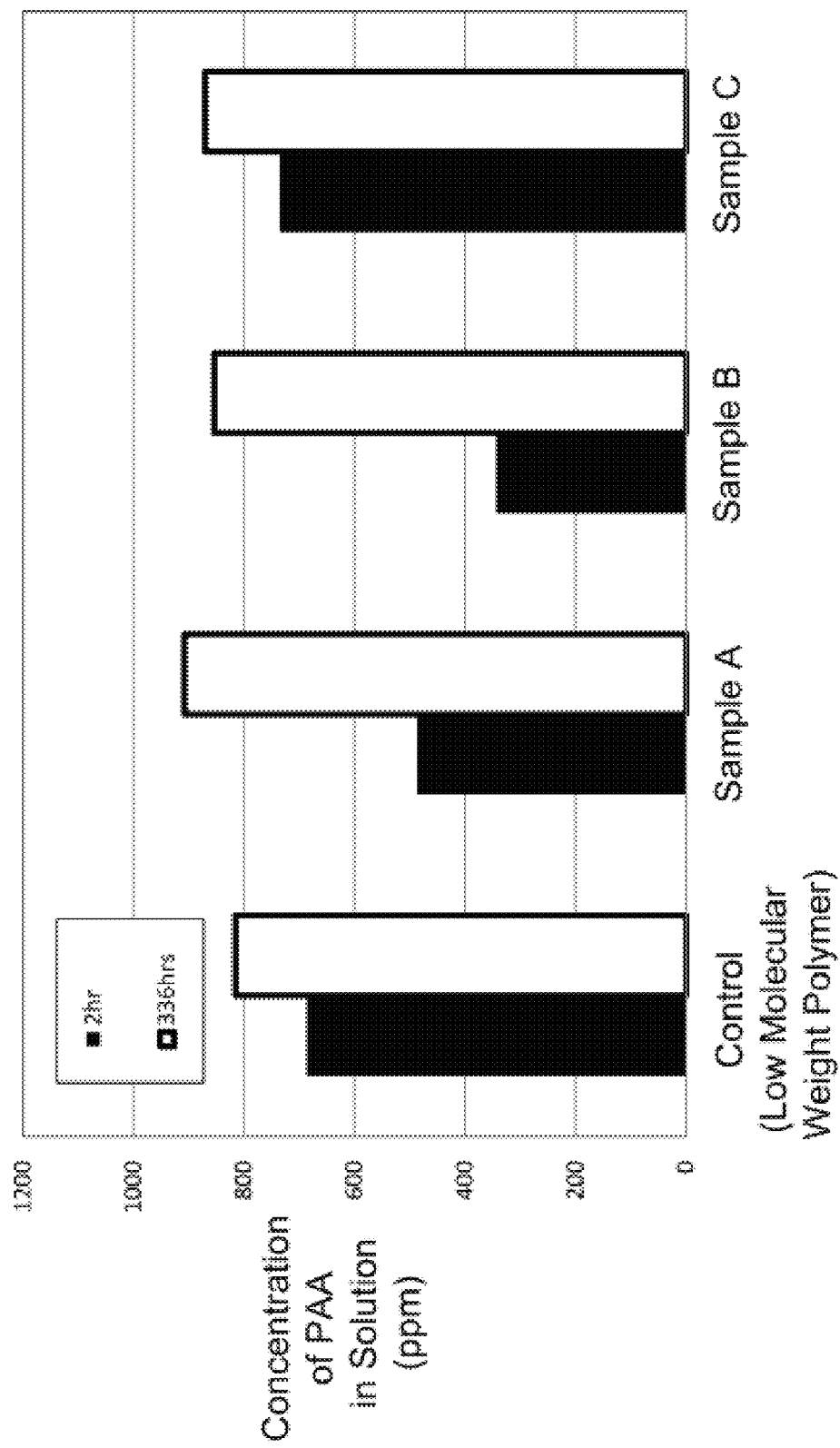
FIG. 10 is a graph illustrating the concentration of polymer released from a control and clay-polymer granules in accordance with embodiments of the disclosure as tested using the elution test in deionized water.
Figure 11:
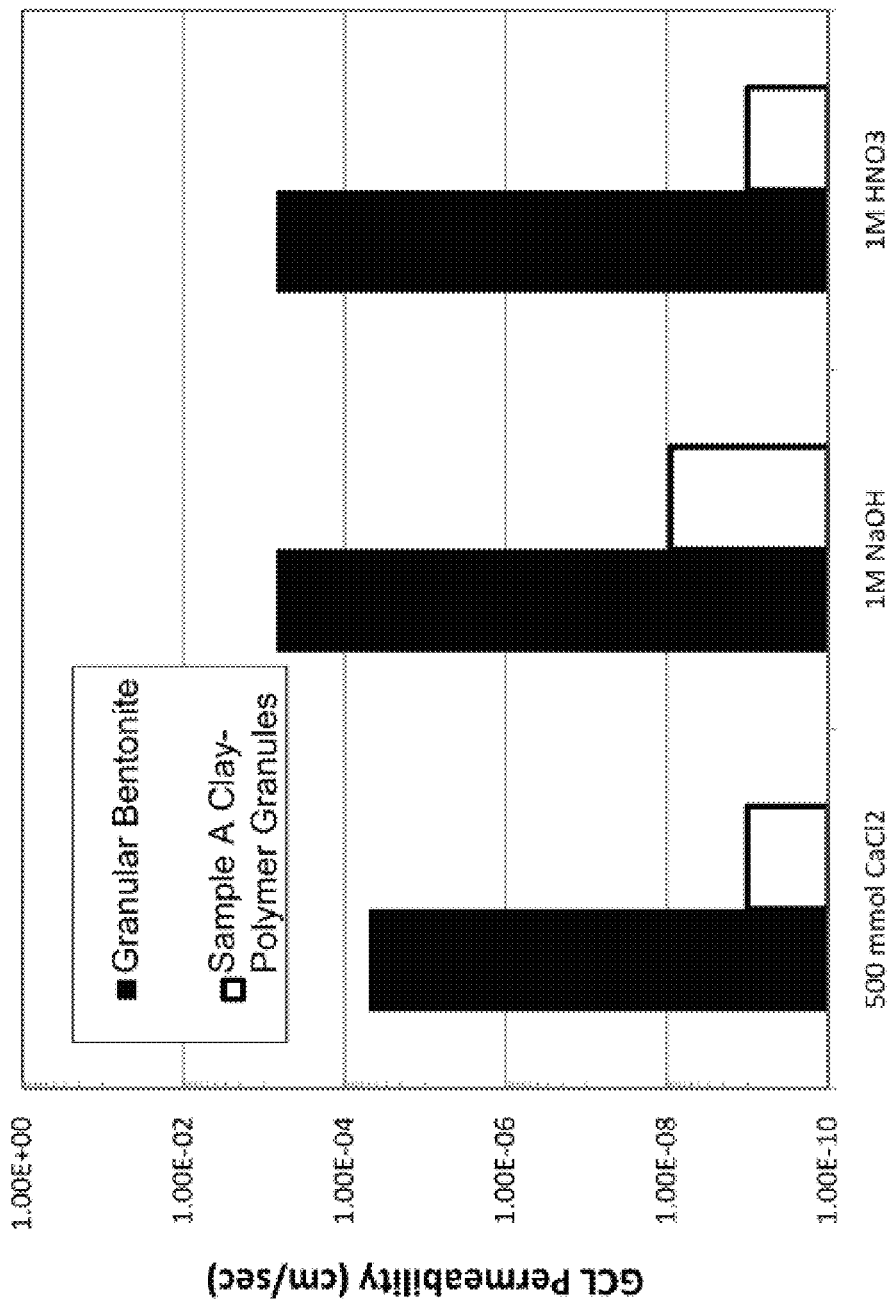
FIG. 11 is a graph illustrating the permeability of a hydraulic barrier composition in accordance with an embodiment of the disclosure as compared to a hydraulic barrier containing bentonite clay in various leachates.

FIG. 10 illustrates the results of the elution test in deionized water The more comparable performance of the samples in accordance with embodiments of the invention and the control demonstrates that unpolymerized monomer in the clay-polymer granules is not the cause of the improved performance in aggressive leachates. FIG. 11 is a comparison of the permeability of a hydraulic barrier formed using granules of sample A and a hydraulic barrier formed using the control (bentonite clay without polymer). The hydraulic barrier containing Sample A demonstrates significantly improved (i.e., lower) permeability in a variety of aggressive leachates as compared to the control.

Example 6

Clay-polymer granules formed in accordance with Example 1 were incorporated into GCL samples and permeability tested in various leachates. Each of the GCL samples included clay-polymer granules formed in accordance with Sample C described in Example 5. The clay-polymer granules in each sample had a size of about 14 mesh to about 200 mesh and polymer loading level of 15% by weight of the granule. Additionally, the samples were prepared by needle punching two sheets having the composition disposed therebetween, with a needle punching density of about 20800 punches/ft². The samples had an total additive loading of 0.91 lbs/ft². Tables 10A and 10D below provide the results of the testing. Each of the clay-polymer compositions were subjected to a leachate and tested to according ASTM D6766 to determine the permeability (cm/sec) of the compositions in the tested leachate. The samples were subjected directly to the leachate and were not prehydrated in deionized water.

In Table 10A, the clay-polymer granules were tested in an aggressive CCR leachate. The leachate has an RMD value of 1.19, an ionic strength of 2.0, and a pH of 7.3. Each of the tested samples were formed by needle punching two sheets having the hydraulic barrier composition disposed therebetween. For comparison, several samples were made with commercially available polymers. LIQUISORB (CETCO, IL) is a commercially available sodium acrylate based superabsorbent polymer. Low molecular weight linear sodium polyacrylate polymers (6K, 60K and 250K) were obtained from Polysciences Inc in solution form, which were dried and sized to 14-80 mesh prior to use. High molecular weight linear sodium polyacrylate was obtained in the dry acid form from Sigma Aldrich, Inc. and neutralized to approximately 60% using a sodium hydroxide solution. The linear sodium polyacrylates were included in equivalent parts if multiple molecular weights were used. For the comparison samples that include the linear sodium polyacrylates, the ratio of cross-linked polymer to linear polymer was 66/34. The mesh size for the additives used as listed in Table 10A.

TABLE 10A

Permeability Testing in CCR Leachate

|  | Mesh size of granules | Polymeric content | Total Additive Loading (polymer + clay) (lbs/ft²) | Needling Density (punches/ln ft) | Perm (cm/sec) |
| --- | --- | --- | --- | --- | --- |
| Clay/Polymer Sample C (Granule) | 14-200 | 2% | 0.91 | 20800 | 6.64E−07 |
| Clay/Polymer Sample C (Granule) | 14-200 | 5% | 0.91 | 20800 | 8.88E−07 |
| Clay/Polymer Sample C (Granule) | 14-200 | 12% | 0.91 | 12695 | 9.61E−09 |
| Clay/Polymer Sample C (Granule) | 14-200 | 12% | 0.91 | 20800 | 6.84E−10 |
| Clay/Polymer Sample C (Granule) | 14-80 | 17% | 0.97 | 20800 | 1.19E−10 |
| Clay/Polymer Sample C (powder) | 200-325 | 12% | 0.91 | 12580 | 3.84E−06 |
| Clay/Polymer Sample C (powder) | 200-325 | 25% | 0.91 | 12580 | 2.24E−07 |
| Clay/Polymer Sample C (powder) | 200-325 | 41% | 0.91 | 12580 | No Out Flow |
| LIQUISORB SAP | 25-100 | 15% | 0.91 | 20800 | 4.67E−07 |
| LIQUISORB SAP + NaPAA (250K) | 25-100 | 13% | 0.91 | 20800 | 3.70E−07 |
| LIQUISORB SAP + NaPAA(6,60, 4000K) | 25-100 | 15% | 0.91 | 20800 | 2.67E−07 |

As demonstrated in Table 10A, the clay-polymer granules in accordance with the disclosure provided improved permeability with lower polymer loading levels.

As shown in Table 10B, synthetic leachates were formulated with chemistries considered to be representative of the various types of end-use applications. Leachates A-F, Trona, CCR, FGD and High Ionic Strength represent leachates that could be expected from the bi-products of burning coal. The nickel and uranium leachates represent the liquors or tailings residue associated with the processing of the respective ores. The leachates shown in Table 10B range in ionic strength from 0.1 to 7.8 mol/liter, pH values from 0.9 to 10.9 and RMD values of 0.02 to 38.5 mol/L^0.5.

TABLE 10B

Chemical Composition of the Various Testing Leachates

Synthetic Leachates

| Chemical Formula | A Conc (mol/L) | B Conc (mol/L) | C Conc (mol/L) | D Conc (mol/L) | E Conc (mol/L) | F Conc (mol/L) | TRONA Conc (mol/L) | CCR Conc (mol/L) | FGD Conc (mol/L) | HIGH IONIC STRENGTH Conc (mol/L) | URANIUM Conc (mol/L) | NICKEL Conc (mol/L) |
| --- | --- | --- | --- | --- | --- | --- | --- | --- | --- | --- | --- | --- |
| Al2SO43 |  |  |  |  |  |  |  |  |  |  | 0.091 | 0.056 |
| NH42SO4 |  |  |  |  |  |  |  |  |  |  | 0.186 |  |

TABLE 10B-continued

Chemical Composition of the Various Testing Leachates

Synthetic Leachates

| Chemical Formula | A Conc (mol/L) | B Conc (mol/L) | C Conc (mol/L) | D Conc (mol/L) | E Conc (mol/L) | F Conc (mol/L) | TRONA Conc (mol/L) | CCR Conc (mol/L) | FGD Conc (mol/L) | HIGH IONIC STRENGTH Conc (mol/L) | URANIUM Conc (mol/L) | NICKEL Conc (mol/L) |
|---|---|---|---|---|---|---|---|---|---|---|---|---|
| $CaCl_2$ | | | 0.016 | 0.007 | 0.004 | 0.007 | 0.001 | 0.039 | 0.06 | 0.356 | 0.043 | 0.012 |
| $CaSO_4$ | 0.01 | 0.01 | 0.01 | 0.01 | 0.01 | 0.01 | | | | | 0.003 | |
| $Cr_2(SO_4)_3$ | | | | | | | | | | | | 0.003 |
| $CoCl_2$ | | | | | | | | | | | | 0.003 |
| $CuSO_4$ | | | | | | | | | | | | 0 |
| $Fe_2SO_{43}$ | | | | | | | | | | | 0.053 | 0.18 |
| $MgCl_2$ | | | | | | | | 0.072 | | | 0.161 | |
| $MgSO_4$ | 0.054 | | 0.066 | 0.052 | 0.015 | 0.033 | | | | | | 0.823 |
| $MnCl_2$ | | | | | | | | | | | 0.002 | |
| $MnSO_4$ | | | | | | | | | | | | 0.018 |
| $NiCl_2$ | | | | | | | | | | | | 0.068 |
| $KCl$ | | | | | | | | | | | | 0.001 |
| $K_2SO_4$ | 0.003 | 0.003 | 0.003 | 0.003 | 0 | 0 | | 0.007 | | | 0.035 | |
| $NaCl$ | | | | | | | 0.97 | 0.272 | 0.015 | 0.192 | | |
| $NaOH$ | 0.001 | 0.001 | 0 | 0 | 0 | 0 | 0.003 | | 0 | 0 | | |
| $Na_2SO_4$ | 0.249 | 0.315 | 0.012 | 0.039 | 0.001 | 0.002 | | 0.136 | | | 0.393 | 0.033 |
| $H_2SO_4$ | | | | | | | | | | | 0.013 | 0.158 |
| $ZnCl_2$ | | | | | | | | | | | 0.003 | |
| $ZnSO_4$ | | | | | | | | | | | | 0.001 |
| RMD $(mol/L)^{0.5}$ | 2 | 6.31 | 0.1 | 0.31 | 0.02 | 0.02 | 38.47 | 1.67 | 0.06 | 0.32 | 1.35 | 0.32 |
| [I] (mol/L) | 1.01 | 1 | 0.39 | 0.4 | 0.12 | 0.2 | 0.98 | 1.04 | 0.19 | 1.26 | 0.95 | 7.77 |
| pH | 9.8 | 10.6 | 6.3 | 6.9 | 6.7 | 6.4 | 10.87 | 7.27 | 10.4 | 10.3 | 1.7 | 0.9 |

Table 10C demonstrates leachates from actual sites where a concentrated brine solution from a mining site and a bauxite liquor from an aluminum mine were obtained. The chemistry of the leachates was analyzed by inductively coupled plasma (ICP) to determine the concentration of the major cation species. The ICP data was used to provide an estimate of the RMD. Electrical conductivity was used to provide an estimate of the ionic strength where the ionic strength (expressed in mol/L) is equal to electrical conductivity (expressed in microsiemens per centimeters divided) by 60,800.

TABLE 10C

Chemical Composition of the Actual Site Leachates

| ACTUAL SITE LEACHATES | BAUXITE LIQUOR | BRINE POND |
|---|---|---|
| Major Cations | Conc (mol/L) | Conc (mol/L) |
| Na+ | 4.73E−01 | 5.96E−01 |
| Al | 1.62E−01 | |
| K+ | 3.28E−04 | |
| Mg2+ | 2.05E−06 | 2.51E−01 |
| Fe+2 | 8.95E−07 | |
| Ca2+ | 4.42E−05 | 2.15E−01 |
| Est. RMD $(mol/L)^{0.5}$ | 1.2 | 0.87 |
| Electrial conductivity (μS/cm) | 42,300 | 133,000 |
| Est. Ionic Strength | 0.70 | 2.19 |
| pH = | 12 | 10.3 |

Table 10D provides the permeability testing results of the samples in these various leachates.

TABLE 10D

Permeability Testing in Various Leachates for a GCL with 15% CPC content and 0.91 lbs/ft^2 total additive loading

| Leachate | RMD $(mol/L)^{0.5}$ | Ionic strength (mol/L) | pH | PERM (cm/sec) |
|---|---|---|---|---|
| LEACHATE A | 2.00 | 1.01 | 9.8 | 1.80E−10 |
| LEACHATE B | 6.31 | 1.00 | 10.6 | 2.74E−10 |
| LEACHATE C | 0.10 | 0.39 | 6.3 | 1.50E−10 |
| LEACHATE D | 0.31 | 0.40 | 6.9 | 7.29E−10 |
| LEACHATE E | 0.02 | 0.12 | 6.7 | 2.69E−10 |
| LEACHATE F | 0.02 | 0.20 | 6.4 | 2.57E−10 |
| TRONA | 38.47 | 0.98 | 10.87 | 2.14E−10 |
| FGD | 0.06 | 0.19 | 10.4 | 4.07E−10 |
| HIGH IONIC STRENGTH | 0.32 | 1.26 | 10.3 | 1.76E−06 |
| BAUXITE LIQUOR | 1.2 | 1.71 (Est) | 12.02 | 1.0E−09 |

As illustrated in Table 10D the hydraulic barriers in accordance with the disclosure provide a good permeability results in a variety of leachates, demonstrating that the hydraulic barriers in accordance with the disclosure can be used in a variety of aggressive industrial environments.

Example 7

Hydraulic Barrier Arrangement

Figure 12:
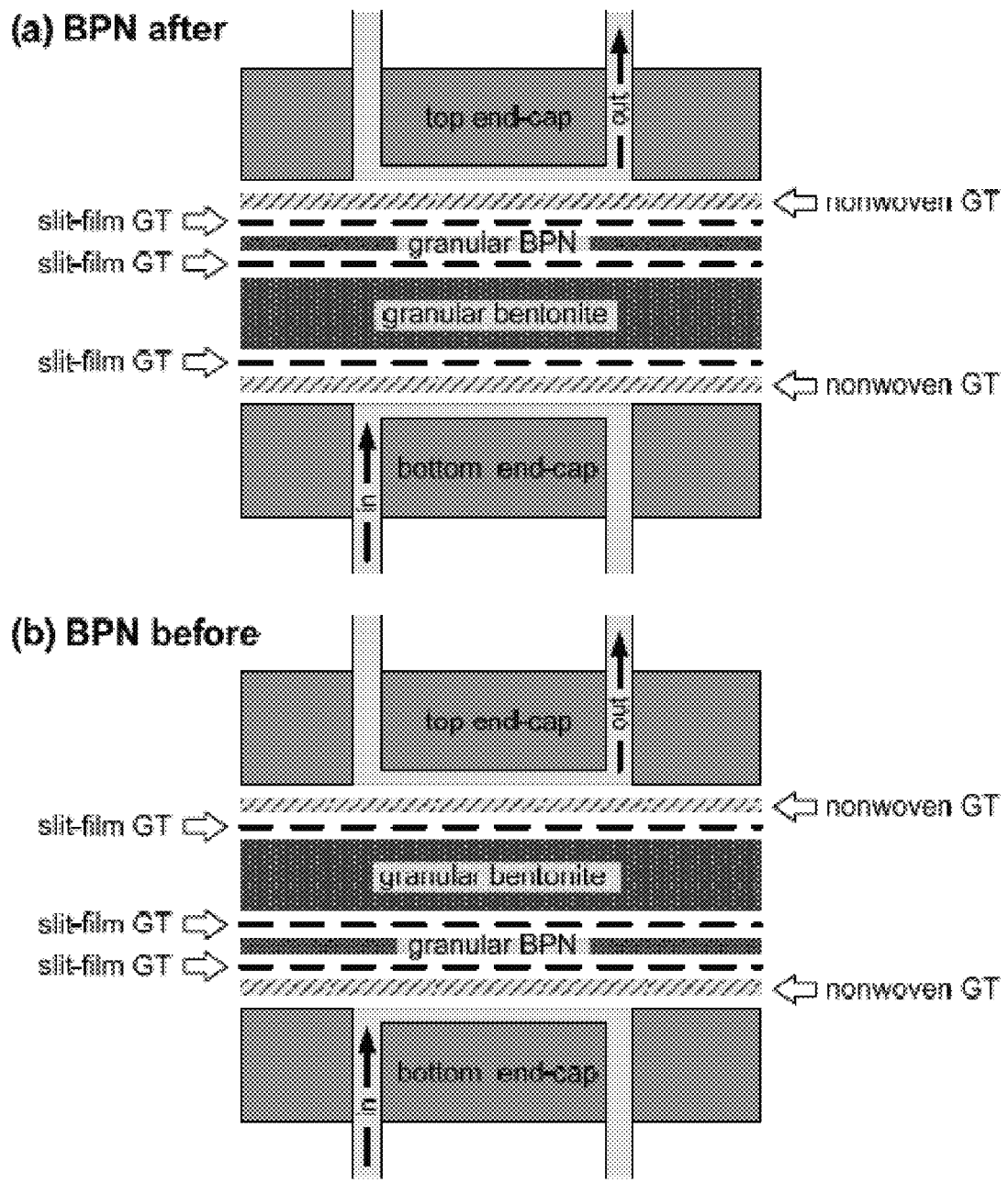
FIG. 12A is a schematic drawing of a hydraulic barrier having a layer of clay-polymer granules placed after (in the direction of fluid flow) a layer of granular clay.
FIG. 12B is a schematic drawing of a hydraulic barrier having a layer of clay-polymer granules placed before (in the direction of fluid flow) a layer of granular clay.

Referring to FIGS. 12A and 12B, the arrangement of the clay-polymer granules relative to granular bentonite clay in a hydraulic barrier was examined. Referring to FIG. 12 A, a hydraulic barrier was formed by placing a layer of clay-polymer granular after (in the direction of flow) the granular bentonite clay. Referring to FIG. 12B, a hydraulic barrier was formed by placing a layer of clay-polymer granular before (in the direction of flow) the granular bentonite. The hydraulic barrier compositions each include 2 wt. % clay-polymer granules and 98 wt % granular bentonite. The hydraulic conductivity tests were run using 50 mM $CaCl_2$ as the leachate. It was observed that placing the clay-polymer granules before the granular bentonite resulted in a significant reduction (improvement) in permeability. The hydraulic conductivity of the hydraulic barrier having the clay-polymer granules placed before the granular bentonite was $3\times10^{-11}$ msec, while the hydraulic conductivity for the hydraulic barrier having the clay-polymer granules disposed after the granular bentonite was $4\times10^{-8}$ msec. Further testing was run on a hydraulic barrier having a mixture of 2 wt. % clay-polymer granules and 98 wt % granular bentonite provided as a single, pre-mixed layer. This hydraulic barrier had a slightly improved hydraulic conductivity of $5\times10^{-11}$ m/s, as compared to the hydraulic barrier providing the clay-polymer granules as a separate layer before the granular bentonite.

Example 8

Clay-AMPS Polymer Granules

Clay-polymer granular compositions were formed using the ingredients and amounts shown in Table 11, below.

while keeping the temperature below 29 degrees Celsius and then allowed to cool to room temperature after neutralization. For the acrylic acid copolymers, the acrylic acid and MBA were added prior to the addition of the AMPS monomer. The clay was then added slowly while mixing using a Sterling Multimixer. The initiator was added and stirred using the Multimixer. About 1 liter of the slurry was placed into a 3 quart baking pan and heated to 190° C. for about 20 minutes. The temperature was then lowered to 110° C. and the polymerized mixture was allowed to remain at the elevated temperature overnight. The resulting material was then broken into smaller chunks and ground to form the clay-polymer granules. Table 2 provides various parameters of the slurry used to form the clay-polymer granules. The clay-polymer granules had a mesh size of about 14-80. The clay-polymer granules were incorporated between two sheet materials at a total loading of 0.91 lbs/ft². The content of the AMPS CPC granules relative to bentonite ranged from 9% up to 15% in this example. The samples were then needle punched at a needling density of 20800 punches/ft² to form a hydraulic barrier for testing.

The granules were evaluated for permeability. The permeability experiments were conducted according to ASTM D 6766 with an average effective stress of 20 kPa and a

TABLE 11

Clay-AMPS Polymer Compositions

| | Material | Function | Amount (wt %) |
|---|---|---|---|
| 100% AMPS-CPC-41 | 2-acrylamido-2-methylpropane sulfonic acid | Organic monomer | 48.0% |
| | N'N' methylene-bisacrylamide | Cross-linking agent | 0.011% |
| | Deionized water | Water | 23.94% |
| | 50% NaOH | Neutralizing agent | 18.53% |
| | Sodium Bentonite Clay | Clay | 16.92% |
| | 30% Sodium Persulfate in water | Initiator | 0.09% |
| | | Total | 100% |
| AMPS/COOH-CPC-42 | 2-acrylamido-2-methylpropane sulfonic acid | Organic monomer | 36.05% |
| | Acrylic Acid, 99% | Organic monomer | 9.73% |
| | | Cross-linking agent | 0.015% |
| | Deionized water | Water | 20.03% |
| | | Neutralizing agent | 22.56% |
| | Sodium Bentonite Clay | Clay | 16.92% |
| | 30% Sodium Persulfate in water | Initiator | 0.12% |
| | | Total | 100% |

The 2-acrylamido-2-methylpropane sulfonic acid (AMPS) monomer was purchased from Sigma Aldrich, Inc. The reaction water was added to a chilled glass vessel at 18 degrees Celsius. While stirring, the AMPS was added in a powder form into the water and mixed until fully dispersed. Methyl ether of hydroquinone (MEHQ) was added as an inhibitor along with the N'N' methylene-bisacrylamide prior to neutralization. The NaOH solution was added drop-wise hydraulic gradient of 200. Various aggressive leachates having low pH and high ionic strengths were tested. To further demonstrate the versatility of the clay-AMPS polymer granules, the permeability was also tested in a high pH leachate, brine pond leachate. Each of the leachates tested below represents leachates in which conventional clay liners do not perform adequate and/or require prehydration. The results of the permeability testing are illustrated in Table 12, below:

TABLE 12

Permeability Testing of the Clay-AMPS Polymer Granules

| Leachate | Leachate RMD (mol/L)^0.5 | Leachate ionic strength (mol/L) | pH | Composition | Polymer Loading in Granules | PERM (cm/sec) |
|---|---|---|---|---|---|---|
| Uranium Leachate | 0.95 | 1.35 | 1.7 | AMPS/COOH BPA (50/50) | 15% | 3.23E−10 |
| Uranium Leachate | 0.95 | 1.35 | 1.7 | AMPS/COOH BPA (50/50) | 15% | 1.02E−09 |
| Nickel Leachate | 0.32 | 7.77 | 0.9 | AMPS/COOH BPA (50/50) | 15% | 1.03E−07 |
| Nickel | 0.32 | 7.77 | 0.9 | AMPS BPA | 15% | 1.55E−10 |

TABLE 12-continued

Permeability Testing of the Clay-AMPS Polymer Granules

| Leachate | Leachate RMD (mol/L)^0.5 | Leachate ionic strength (mol/L) | pH | Composition | Polymer Loading in Granules | PERM (cm/sec) |
|---|---|---|---|---|---|---|
| Leachate Nickel Leachate | 0.32 | 7.77 | 0.9 | AMPS BPA (100%) | 9% | 5.08E−06 |
| Brine Pond Leachate | 0.87 | 1.78 | 10.3 | AMPS-SBPA (100%) | 15% | 7.48E−10 |

The clay-polymer granules were further analyzed for free swell and fluid loss in an aggressive nickel leachate. The following compositions were tested and compared: 100% AMPS polymer (no clay), clay-polymer granules with the polymer being 100% (referred to in Table 13 as 100% AMPS with clay) AMPS, clay-polymer granules with the polymer having a 50/50 mixture of AMPS and NaPAA (referred to in Table 13 as 50/50 AMPS/NaPAA with clay), and clay-polymer granules with the polymer having a 30/70 mixture of AMPS and NaPAA (referred to in Table 13 as 30/70 AMPS/NaPAA with clay). Testing was done in accordance with ASTM 5890, with the leachate being substituted for water. The clay-AMPS polymer granules demonstrated surprising good free swell and limited fluid loss in the aggressive leachate. These results further demonstrate that the benefit of containing such aggressive leachates can be realized when combining AMPS with other polymer, provided a sufficient amount of AMPS is present. The results of the testing are illustrated in Table 13, below.

TABLE 13

Free Swell and Fluid Loss Testing

| Composition | Free swell | Fluid Loss |
|---|---|---|
| 100% AMPS (no clay) | 30 | 5 |
| 100% AMPS with clay | 100 | 4 |
| 50/50 AMPS/NaPAA with clay | 66 | 3 |
| 30/70 AMPS/NaPAA with clay | 45 | 32 |

While various embodiments have been described above, this disclosure is not intended to be limited thereto. Variations can be made to the disclosed embodiments that are still within the scope of the appended claims.

What is claimed:

1. A method comprising:
providing a clay-polymer composite comprising a clay and a polymer, the polymer of the composition formed from one or more monomers, at least one monomer being acrylamido-methyl-propane sulfonate (AMPS);
wherein providing the clay-polymer composite comprises
polymerizing AMPS monomer, optionally with one or more other monomers, and optionally, with one or more crosslinking agents, one or more additives, or one or more crosslinking agents and one or more additives, in the presence of the clay;
or
blending the clay and the polymer and optionally one or more additives, the polymer being a pre-synthesized polymer;
and
forming a hydraulic barrier composition comprising the clay-polymer composite.

2. A hydraulic barrier composition comprising:
clay-polymer granules comprising a clay and a polymer, the polymer comprising a cross-linked polymer portion and a linear polymer portion, and the polymer of the composition being a homopolymer formed from acrylamido-methyl-propane sulfonate (AMPS), being a copolymer formed from AMPS and at least one other monomer, or being a blend of one or more polymers, at least one being a homopolymer of AMPS, at least one being a copolymer of AMPS, or at least one being a homopolymer of AMPS and at least one being a copolymer of AMPS;
wherein the composition has a hydraulic conductivity of $1 \times 10^{-7}$ cm/sec or less when exposed to leachates having an ionic strength of 0.02 mol/liter to 3 mol/liter, a ratio of monovalent to divalent ions (RMD) value of less than 50 $M^{1/2}$, or both.

3. The method of claim 1, wherein the polymer of the clay-polymer composite comprises:
(a) a linear portion and a cross-linked portion;
(b) a low molecular weight portion of a molecular weight of less than or about equal to 600,000 g/mol, and a high molecular weight portion; or
both (a) and (b).

4. The method of claim 1, wherein the polymer of the clay-polymer composite comprises one or more other monomers selected from the group consisting of alkylacrylamides, methacrylamides, styrenes, allylamines, allylammonium, diallylamines, diallylammoniums, alkyl acrylates, methacrylates, acrylates, n-vinyl formamide, vinyl ethers, vinyl sulfonate, acrylic acid, sulfobetaines, carboxybetaines, phosphobetaines, and maleic anhydride and mixtures thereof.

5. The method of claim 1, wherein the polymer clay-polymer composite comprises sodium polyacrylate.

6. A hydraulic barrier composition, comprising
clay-polymer granules comprising a water-swellable clay and a sulfonated water-soluble polymer, the sulfonated polymer of the composition formed from acrylamido-methyl-propane sulfonate (AMPS) and optionally one or more other monomers;
and the composition comprising the clay-polymer granules being disposed between a first and a second sheet material.

7. The method of claim 1, wherein the clay of the composite is a water-swellable clay.

8. The method of claim 1, wherein the polymer comprises about 2 wt % to about 80 wt % based on the total weight of the clay-polymer composite.

9. The method of claim 7, wherein the water-swellable clay comprises a water-swellable smectite clay.

10. The method of claim 9, wherein the water-swellable smectite clay is selected from the group consisting of sodium montmorillonite, sodium bentonite, sodium activated calcium bentonite, and mixtures thereof.

11. The method of claim 1, wherein the clay-polymer composite is ground into clay-polymer granules at least a portion of which are used in forming the hydraulic barrier composition.

12. The method of claim 11, wherein at least 80% of the clay-polymer granules, by number, have a size in a range of about 6 mesh to about 325 mesh.

13. The method of claim 1, wherein the clay-polymer composite is provided by polymerizing AMPS monomer, optionally with one or more other monomers, and optionally, with one or more crosslinking agents, one or more additives, or one or more crosslinking agents and one or more additives, in the presence of the clay.

14. The method of claim 1, wherein the clay-polymer composite is provided by blending the clay and the polymer and optionally one or more additives, the polymer being a pre-synthesized polymer.

15. The method of claim 11, wherein the clay-polymer granules used in forming the hydraulic barrier composition are in the 14 mesh (1410 μm) to 80 mesh (177 μm) size range.

16. The method of claim 11, wherein forming the hydraulic barrier composition comprises disposing the clay-polymer granules and optionally disposing filler granules and optionally disposing other materials, in between a first sheet material and a second sheet material, and attaching the second sheet material to the first sheet material.

17. The method of claim 16, wherein the filler granules are present, the filler granules comprising a filler.

18. The method of claim 17, wherein the combination of the filler granules and the clay-polymer granules comprise at least 0.25 wt. % clay-polymer granules.

19. The method of claim 17, wherein the filler is selected from the group consisting of a water-swellable clay, gypsum, fly ash, silicon carbide, silica sand, lignite, recycled glass, calcium sulfate, cement, calcium carbonate, talc, mica, vermiculite, acid activated clays, kaolin, silicon dioxide, titanium dioxide, calcium silicate, calcium phosphate, and mixtures thereof.

20. The method of claim 19, wherein the filler comprises a water-swellable clay.

21. The method of claim 20, wherein the water-swellable clay of the filler comprises a water-swellable smectite clay.

22. The method of claim 16, wherein the first sheet is attached to the second sheet by needle punching, chemical binding, adhesive binding, or a combination thereof.

23. The method of claim 16, wherein the first sheet is attached to the second sheet by needle punching, and at least 80%, by number, of the clay-polymer granules have a size in a range of 6 mesh to 320 mesh.

24. The method of claim 23, comprising 10,000 to 24,000 needle punching strikes per foot.

25. A method of containing a leachate, comprising;
disposing the hydraulic barrier of claim 7 in contact with an aqueous leachate,
wherein upon contact with the leachate the hydraulic barrier composition is activated to contain the leachate, and upon activation at least a portion of the polymer of the clay-polymer granules is solvated by the leachate and at least a portion of the polymer becomes entrapped in at least one of the clay pores, at clay platelet edges, and between adjacent clay platelets.

26. The method of claim 25, wherein the leachate has a pH of less than about 3 and the hydraulic barrier composition is activated in about 1 second to about 4 hours.

27. The method of claim 25, wherein the leachate has a pH of greater than 8 and the hydraulic barrier composition is activated in about 1 second to about 4 hours.

28. The method of claim 25, wherein the leachate has an ionic strength of greater than about 50 mmol/liter, and the hydraulic barrier is activated in about 1 second to about 4 hours.

29. The method of claim 25, wherein the leachate has an RMD value of less than 20 $M^{1/2}$, and the hydraulic barrier composition is activated in about 1 second to about 4 hours.

30. The method of claim 25, wherein the leachate has an ionic strength of 0.05 mol/liter to 1.2 mol/liter and an RMD value of less than 50 $M^{1/2}$ and the method comprises containing the leachate with a hydraulic conductivity of $1 \times 10^{-7}$ cm/sec or less.

31. The method of claim 25, wherein the leachate has a pH of less than 1.5 and an ionic strength of greater than 1 mol/liter, the clay-polymer granules comprise a sulfonated water-soluble polymer, and the method comprises containing the leachate with a hydraulic conductivity of $1 \times 10^{-7}$ cm/sec or less.

32. The method of claim 13, wherein polymerizing comprises:
contacting a clay-containing slurry with a polymerization initiator, wherein the clay-containing slurry comprises clay and one or more monomers; and
initiating polymerization of the clay-containing slurry and polymerization initiator under conditions sufficient to polymerize the one or more monomers to form a clay-polymer composite;
wherein the clay-polymer composite has a linear polymer component and a cross-linked polymer component.

33. The method of claim 32, wherein initiating polymerization comprises heating the clay-containing slurry and the polymerization initiator, exposing the clay-containing slurry and the polymerization initiator to ultraviolet radiation, exposing the clay-containing slurry and the polymerization initiator to infrared radiation, exposing the clay-containing slurry and the polymerization initiator to a redox reaction, exposing the clay-containing slurry to ionizing radiation, or a combination thereof.

34. The method of claim 33, wherein initiating polymerization comprises heating the clay-containing slurry and polymerization initiator to a temperature of about 150° C. to about 240° C.

35. The method of claim 34, wherein the clay-containing slurry and polymerization initiator are heated for a time of about 0.5 minute to about 30 minutes.

36. The method of claim 34, further comprising maintaining the clay-polymer composite at an elevated temperature after heating, the elevated temperature being higher than the temperature of the polymerization step.

37. The method of claim 36, wherein the elevated temperature is about 150° C. to about 250° C.

38. The method of claim 36, wherein the clay-polymer composite is maintained at the elevated temperature for a time of about 4 minutes to about 30 minutes.

39. The method of claim 36, comprising heating the clay-containing slurry and the polymerization initiator by passing the clay-containing slurry and the polymerization initiator through an oven at a rate of about 1 foot per minute to about 40 feet per minute, wherein the oven has a temperature of about 100° C. to about 288° C.

40. The method of claim 21, wherein the water-swellable smectite clay is selected from the group consisting of sodium montmorillonite, sodium bentonite, sodium activated calcium bentonite, and mixtures thereof.

41. The method of claim 32, wherein the ratio of monomer to clay is about 1:19 to about 19:1.

42. The method of claim 41, wherein the ratio of monomer to clay is about 3:1 to about 1:5.

43. The method of claim 32, wherein at least one other monomer is present and is selected from the group consisting of acrylic acid, alkali metal acrylate, acrylamide, and mixtures thereof.

44. The method of claim 32, wherein at least one other monomer is present and is selected from the group consisting of alkylacrylamides, methacrylamides, styrenes, allylamines, allylammonium, diallylamines, diallylammoniums, alkylacrylates, methacrylates, acrylates, n-vinyl formamide, vinyl ethers, vinyl sulfonate, acrylic acid, sulfobetaines, carboxybetaines, phosphobetaines, and maleic anhydride, and mixtures thereof.

45. The method of claim 32, wherein the clay-containing slurry further comprises water.

46. The method of claim 45, wherein the clay-containing slurry comprises about 20 wt. % to about 50 wt. % water based on the total weight of the clay-containing slurry.

47. The method of claim 32, wherein the optional cross-linking agent is present, and the clay-containing slurry comprises the cross-linking agent.

48. The method of claim 32, wherein the clay-containing slurry further comprises a neutralizing agent.

49. The method of claim 16, wherein at least one other material is present, the other material being a second water-soluble polymer which is mixed with the clay-polymer granules prior to disposing the clay-polymer granules between a first sheet material and a second sheet material.

50. The method of claim 49, wherein the second water-soluble polymer is a super-absorbent polymer.

51. The hydraulic barrier composition of claim 6, wherein the composition has a hydraulic conductivity of $1 \times 10^{-7}$ cm/sec or less when exposed to leachates having a pH of less than 1.5 and an ionic strength of about 0.1 mol/liter to about 10 mol/liter.

52. The hydraulic barrier composition of claim 6, wherein the composition disposed between the first and second sheet materials is at a total loading of at least 0.91 lbs/ft$^2$.

53. The hydraulic barrier composition of claim 52, further comprising filler granules, the filler granules comprising a filler.

54. The hydraulic barrier composition of claim 53, wherein the combination of the filler granules and the clay-polymer granules comprises at least 0.25 wt % clay-polymer granules.

55. The hydraulic barrier composition of claim 53, wherein the filler is selected from the group consisting of a water-swellable clay, gypsum, fly ash, silicon carbide, silica sand, lignite, recycled glass, calcium sulfate, cement, calcium carbonate, talc, mica, vermiculite, acid activated clays, kaolin, silicon dioxide, titanium dioxide, calcium silicate, calcium phosphate, and mixtures thereof.

56. The hydraulic barrier composition of claim 55, wherein the filler comprises a water-swellable clay.

57. The hydraulic barrier composition of claim 55, wherein the water-swellable clay of the filler is selected from the group consisting of sodium montmorillonite, sodium bentonite, sodium activated calcium bentonite, and mixtures thereof.

58. The hydraulic barrier composition of claim 7, wherein the second sheet material is attached to the first sheet material by needle punching.

59. A method of containing a leachate, comprising;
disposing the hydraulic barrier of claim 2 in contact with an aqueous leachate,
wherein upon contact with the leachate the hydraulic barrier composition is activated to contain the leachate, and upon activation at least a portion the polymer of the clay-polymer granules is solvated by the leachate and at least a portion of the polymer becomes entrapped in at least one of the clay pores, at clay platelet edges, and between adjacent clay platelets.

60. The hydraulic barrier composition of claim 2, further comprising filler granules, the filler granules comprising a filler.

* * * * *